United States Patent
Shin et al.

(10) Patent No.: US 9,544,645 B2
(45) Date of Patent: Jan. 10, 2017

(54) VIDEO DISPLAY DEVICE AND OPERATING METHOD THEREOF

(71) Applicant: LG ELECTRONICS INC., Seoul (KR)

(72) Inventors: Jeongsoo Shin, Seoul (KR); Youngju Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/607,844

(22) Filed: Jan. 28, 2015

(65) Prior Publication Data
US 2016/0029077 A1 Jan. 28, 2016

(30) Foreign Application Priority Data
Jul. 23, 2014 (KR) .................. 10-2014-0093562

(51) Int. Cl.
| | |
|---|---|
| *H04N 5/445* | (2011.01) |
| *H04N 21/4415* | (2011.01) |
| *H04N 21/422* | (2011.01) |
| *G06F 3/048* | (2013.01) |
| *H04N 5/44* | (2011.01) |
| *H04N 21/442* | (2011.01) |
| *H04N 21/45* | (2011.01) |
| *H04N 21/478* | (2011.01) |

(52) U.S. Cl.
CPC .......... *H04N 21/4415* (2013.01); *G06F 3/048* (2013.01); *H04N 5/4403* (2013.01); *H04N 21/4221* (2013.01); *H04N 21/42201* (2013.01); *H04N 21/44218* (2013.01); *H04N 21/4532* (2013.01); *H04N 21/478* (2013.01); *H04N 2005/4407* (2013.01); *H04N 2005/4414* (2013.01); *H04N 2005/4428* (2013.01)

(58) Field of Classification Search
CPC ........................... H04N 21/466; H04N 21/482
USPC ........................................ 725/9, 52
See application file for complete search history.

(56) References Cited

U.S. PATENT DOCUMENTS

| | | | | |
|---|---|---|---|---|
| 2007/0239566 | A1* | 10/2007 | Dunnahoo | ........ G06F 17/30867 705/26.1 |
| 2007/0266403 | A1* | 11/2007 | Ou | ........................ G06Q 30/02 725/46 |

\* cited by examiner

*Primary Examiner* — Dominic D Saltarelli
(74) *Attorney, Agent, or Firm* — Birch, Stewart, Kolasch & Birch, LLP

(57) ABSTRACT

An operating method of a video display device is provided. The method includes: obtaining at least one of user's bio information and pattern input; upon the receipt of a user input for a function key input of the video display device within a predetermined time, performing an operation personalized to the user on the basis of at least one of the obtained user's bio information and pattern input and the function key input; and upon the receipt of the user input for the function key input after the predetermined time elapses, performing an operation corresponding to the function key.

20 Claims, 26 Drawing Sheets

FIG.9

PLEASE INPUT USER INFORMATION.

NAME
ID

Yes    No

FIG.11

PLEASE SET FUNCTION KEY INPUT TIME.

☐☐ Second

AFTER FINGERPRINT RECOGNITION, SET TIME FOR RECOGNIZING FUNCTION KEY INPUT.

VIDEO DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2014-0093562 (filed on Jul. 23, 2014), which is hereby incorporated by reference in its entirety.

BACKGROUND

The present disclosure relates to a video display device and an operating method thereof, and particularly, to a video display device recognizing user's bio information and pattern input and providing a personalized function for a user corresponding to the recognized bio information and pattern input and an operating method thereof.

Recently, a digital TV service using a wired or wireless communication network becomes generalized. The digital TV service may provide various services that cannot be provided from an existing analog broadcast service.

For example, in the case of internet protocol television service (IPTV), one type of the digital TV service, it provides an interaction that allows a user to actively select the type of viewing program and viewing time. The IPTV service may provide various enhanced services on the basis of such an interaction, for example, internet search, home shopping, and online game.

Moreover, compared to that recent smart TVs provide various functions and contents, users may not receive proper menus and functions. Accordingly, although smart TVs provide various functions and services, they are not properly used.

Additionally, recent smart TVs provide the execution or setting of detailed functions through a layered menu structure. However, as functions of smart TVs become more diversified and complex, the menu structures of the smart TVs may need to be configured with more layers. Then, as the menu structures of the smart TVs are configured with more layers, a user may need to undergo several steps of a complex layer structure in order to execute or set a function that the user wants. Additionally, it is difficult for a user to remember a structure that is required for executing complex menus and detailed functions of smart TVs.

Therefore, required is a method for executing or setting a desired function without going through complex layered structures of smart TVs. Moreover, required is an operating method that does not require a user to memorize or learn manipulations for functions of smart TVs.

Furthermore, required are functions and contents fit for a user of a TV and also required is a method for easily executing a personalized function and a personalized menu fit for a user.

SUMMARY

Embodiments provide a device recognizing user's bio information and pattern input and providing functions and contents fit for the recognized user.

The embodiments also provide a device easily providing a personalized function and menu through a combination of user's bio information, pattern input, and function key input.

In one embodiment, an operating method of a video display device is provided. The method includes: obtaining at least one of user's bio information and pattern input; upon the receipt of a user input for a function key input of the video display device within a predetermined time, performing an operation personalized to the user on the basis of at least one of the obtained user's bio information and pattern input and the function key input; and upon the receipt of the user input for the function key input after the predetermined time elapses, performing an operation corresponding to the function key.

In another embodiment, a video display device includes: a user input interface unit obtaining at least one of user's bio information and pattern input; and a control unit, wherein the control unit, upon the receipt of a user input for a function key input of the video display device within a predetermined time, performs an operation personalized to the user on the basis of at least one of the obtained user's bio information and pattern input and the function key input, and upon the receipt of the user input for the function key input after the predetermined time elapses, performs an operation corresponding to the function key.

The details of one or more embodiments are set forth in the accompanying drawings and the description below. Other features will be apparent from the description and drawings, and from the claims.

BRIEF DESCRIPTION OF THE DRAWINGS

FIGS. 8 to 11 are views illustrating a screen of a personalized service setting according to an embodiment of the present invention.

DETAILED DESCRIPTION OF THE EMBODIMENTS

Hereinafter, embodiments of the present invention will be described in more detail with reference to the accompanying drawings. The suffixes "module" and "unit" for components used in the description below are assigned or mixed in consideration of easiness in writing the specification and, do not have distinctive meanings or roles by themselves.

Hereinafter, a screen display controlling method and a video display device using the same according to an embodiment of the present invention are described in detail with reference to the accompanying drawings.

A video display device according to an embodiment of the present invention, for example, as an artificial video display device adding a computer supporting function to a broadcast receiving function, may have an easy-to-use interface such as a handwriting type input device, a touch screen, or a spatial remote controller. Moreover, with the support of a wired or wireless internet function, the video display may perform a function such as e-mail, web browsing, internet banking, or online game by accessing internet or computers. A standardized general-purpose OS may be used for such various functions.

Accordingly, since various applications are added or deleted freely on a general-purpose OS kernel, a video display device described in the present invention may perform user-friendly various functions. In more detail, the video display device, for example, may be a network TV, an HBBTV, a smart TV, an LED TV, or an OLED TV, and if necessary, may be applied to a smartphone.

Figure 1:
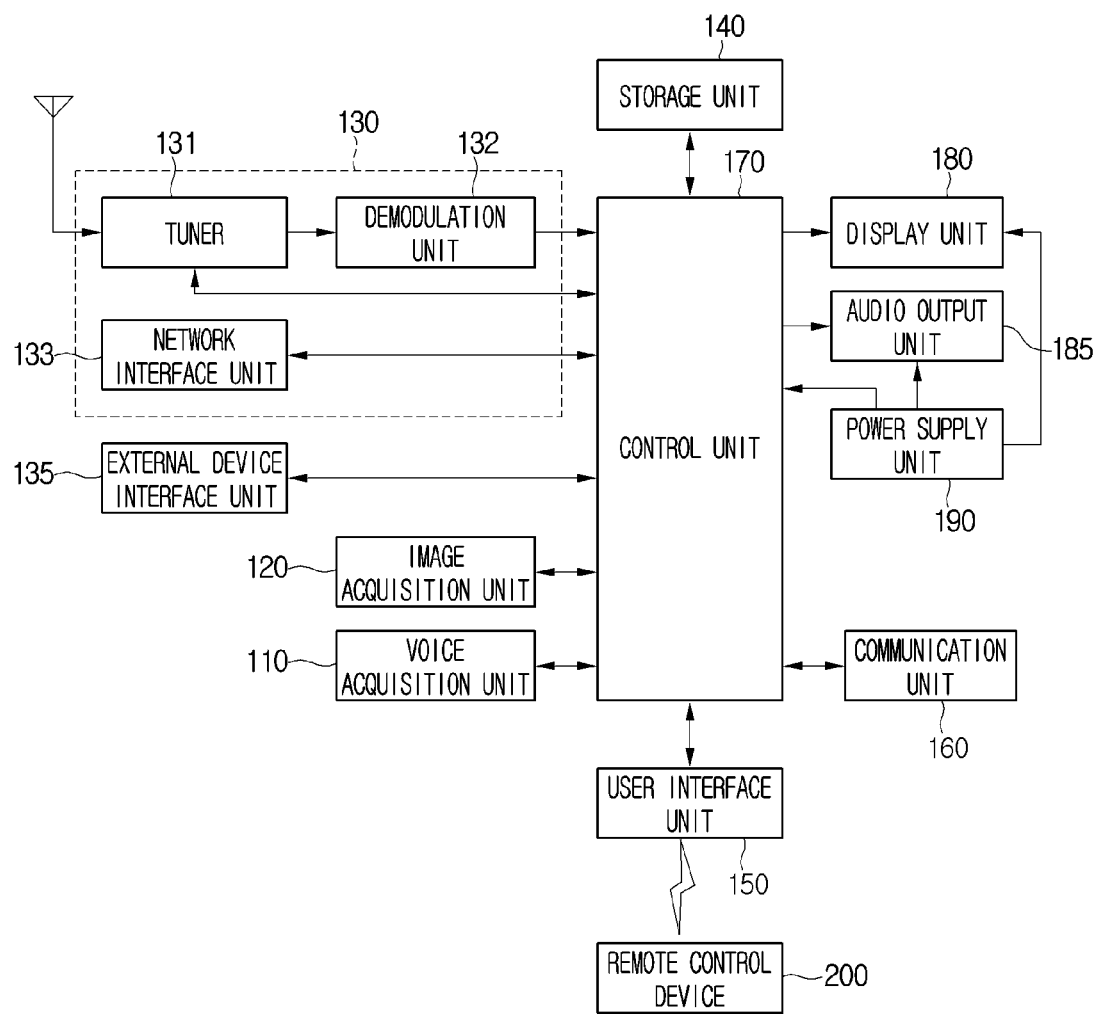
FIG. 1 is a block diagram illustrating a configuration of a video display device according to an embodiment of the present invention.

FIG. 1 is a block diagram illustrating a configuration of a video display device according to an embodiment of the present invention.

Referring to FIG. 1, the video display device 100 may include a voice acquisition unit 110, a video acquisition unit 120, a broadcast reception unit 130, an external device interface unit 135, a storage unit 140, a user input interface unit 150, a communication unit 160, a control unit 170, a display unit 180, an audio output unit 185, and a power supply unit 190.

The voice acquisition unit 110 may obtain a voice.

The voice acquisition unit 110 may include at least one mike and thus, may obtain a voice through an included mike.

Then, the voice acquisition unit 110 may deliver the obtained voice to the control unit 170.

The image acquisition unit 120 may obtain an image.

The image acquisition unit 120 may include at least one camera and thus, may obtain an image through an included camera. The image acquisition unit 120 may obtain an image for a user. The image acquisition unit 120 may obtain an image for bio information such as a user's iris and vein.

Then, the image acquisition unit 120 may deliver the obtained image to the control unit 170.

Moreover, the voice acquisition unit 110 and the image acquisition unit 120 may be included in the user input interface unit 150.

Moreover, the broadcast reception unit 130 may include a tuner 131, a demodulation unit 132, and a network interface 133.

The external device interface unit 135 may receive an application or an application list in an adjacent external device and may then deliver it to the control unit 170 or the storage unit 140.

The external device interface unit 135 may include a terminal to connect to an external device, so that it may be connected to a connector of the external device.

The external device interface unit 135 may supply a power received from the power supply unit 190 to a connected external device as driving power.

Additionally, the external device interface unit 135 may deliver an operation signal that an external device transmits to the control unit 170.

On the other hand, the external device interface unit 135 may deliver a voice signal that the control unit 170 transmits to an external device.

Moreover, the external device interface unit 135 may include a sensor detecting a connection of an external device, so that it may recognize the connection.

The network interface unit 133 may provide an interface to connect the video display device 100 to a wired/wireless network including an internet network. The network interface unit 133 may transmit ore receive data to or from another user or another electronic device via an accessed network or another network linked to an accessed network.

Moreover, the network interface may transmit part of contents data stored in the video display device 100 to a selected user or a selected electronic device among pre-registered other users or other electronic devices.

The network interface unit 133 may access a predetermined webpage via an accessed network or another network linked to an accessed network. That is, the network interface unit 1300 may transmit or receive data to or from a corresponding server by accessing a predetermined webpage via a network.

Then, the network interface unit 133 may receive contents or data provided from a contents provider or a network operator. That is, the network interface unit 133 may receive contents such as movies, advertisements, games, VOD, and broadcast signals provided from a contents provider or a network provider via a network and information relating thereto.

Additionally, the network interface unit 133 may receive update information and update files of firmware provided from a network operator and may transmit data to an internet or contents provider or a network operator.

The network interface unit 133 may select and receive a desired application among applications open to the public via a network.

The storage unit 140 may store a program for each signal processing and control in the control unit 170 and may store signal processed images, voices, or data signals.

Additionally, the storage unit 140 may perform a function for temporarily storing images, voices or data signals inputted from the external device interface unit 135 or the network interface unit 133, and may store information on a predetermined image through a channel memory function.

The storage unit 140 may store an application or an application list inputted from the external device interface unit 135 or the network interface unit 133.

Moreover, the storage unit 140 may store user's bio information. Herein, the user's bio information may mean unique information relating to a user's body, for example, a user's fingerprint, iris, vein, face, and voice.

The video display device 100 may play a contents file (for example, a video file, a still image file, a music file, a document file, and an application file) stored in the storage unit 140 and may then provide it to a user.

Moreover, the storage unit 140 may store personalized service information on a user. Herein, the personalized service information on a user may include information on at least one of functions that a user frequently uses, channels and contents that a user frequently views, and setting values that a user sets. Then, the personalized service information on a user may include information on a personalized function and menu for each of a plurality of users.

The user input interface unit 150 may deliver a signal that a user inputs to the control unit 170 or may deliver a signal from the control unit 170 to a user. For example, the user input interface unit 150 may receive and process a control signal for power on/off, channel selection, and screen setting from a remote control device 200 or may transmit a control signal from the control unit 170 to the remote control device 200 according to various communication methods such as Bluetooth, Ultra Wideband (WB), ZigBee, Radio Frequency (RF) and IR communication methods.

Additionally, the user input interface unit 150 may deliver a control signal inputted from a local key (no shown) such as a power key, a channel key, a volume key, and a setting key to the control unit 170.

The communication unit 160 may include at least one module that allows a wired communication or a wireless communication between the video display device 100 and a network or between the video display device 100 and a peripheral device. Herein, the peripheral device may include at least one of a remote control device 200 described later and a terminal 300.

For example, the communication unit 160 may include an internet module for internet access and may allow the video display device 100 to access the internet by using the internet module through a wired or wireless communication.

For another example, the communication unit 160 may include a short-range communication module to allow the video display device 100 to wirelessly communicate with another device. According to an embodiment of the present invention, a short-range communication module included in the communication unit 160 may use Bluetooth, Radio Frequency Identification (RFID), infrared Data Association (IrDA), Ultra Wideband (UWB), ZigBee, Wireless LAN (WLAN)(for example, Wi-Fi), and Near Field Communication (NFC).

An image signal image-processed in the control unit 170 may be inputted to the display unit 180 and may then be displayed as an image corresponding to a corresponding image signal. Additionally, an image signal image-processed in the control unit 170 may be inputted to an external output device through the external device interface unit 135.

A voice signal processed in the control unit 170 may be outputted to the audio output unit 185. Additionally, a voice signal processed in the control unit 170 may be inputted to an external device through the external device interface unit 135.

Besides that, the control unit 170 may control overall operations in the video display device 100.

The control unit 170 receives a detection signal for a connection of an external device from the external device interface unit 135 and may then control the power supply unit 190 so that driving power is delivered to an external device connected to the external device interface unit 135.

Furthermore, the control unit 170 may recognize a voice obtained through the voice acquisition unit 110 and may then perform a control operation corresponding to the recognized voice.

Then, the control unit 170 may compare a plurality of voice signals for a user's voice and may then recognize the voice of the best quality voice signal to perform a control operation corresponding to the recognized voice.

The control unit 170 may determine the location of a user by comparing a plurality of voices obtained from the voice acquisition unit 110 including a plurality of mikes. In more detail, the control unit 170 may determine the location of a user who makes a sound by comparing voices obtained by each of a plurality of mikes.

Moreover, the control unit 170 may control the video display device 100 through a user instruction inputted through the user input interface unit 150 or an internal program, or may download an application or an application list that a user wants into the video display device 100 by accessing a network.

The control unit 170 may allow both information on a channel that a user selects and processed image or voice to be outputted through the display unit 180 or the audio output unit 185.

Moreover, the control unit 170 may allow image signals or voice signals inputted from an external device connected through the external device interface unit 135, for example, a camera or a camcorder, to be outputted through the display unit 180 or the audio output unit 185 in response to an external device image playback instruction received through the user input interface unit 150.

Moreover, the control unit 170 may perform a control on the display unit 180 to display an image and for example, may perform a control to display on the display unit 180 a broadcast image inputted through the tuner 131, an external input image inputted through the external device interface unit 135, an image inputted through the network interface unit 133, or an image stored in the storage unit 140. In this case, an image displayed on the display unit 180 may be a still image or a video, or may be a 2D image or a 3D image.

Additionally, the control unit 170 may perform a control to play contents stored in the video display device 100, received broadcast contents, or external input contents inputted from the outside, and the contents may be in various forms, for example, a broadcast image, an external input image, an audio file, a still image, an accessed web screen, and a document file.

Additionally, the control unit 170 may compare at least one of inputted user's bio information or pattern information with at last one of pre-stored bio information and pattern information. Accordingly, the control unit 170 may search for bio information identical to the inputted user's bio information from the pre-stored bio information and pattern information.

Additionally, the control unit 170 may obtain user's personalized service information corresponding to at least one of the inputted user's bio information and pattern information on the basis of at least one of the inputted user's bio information and pattern information. For example, the control unit 180 may recognize a user on the basis of a user's received fingerprint image or information on a fingerprint. Then, the control unit 180 may obtain personalized service information corresponding to the recognized user.

The display unit 180 may convert an image signal processed in the control unit 170, a data signal, an OSD signal, an image signal received from the external device interface unit 135, or a data signal into R, G, and B signals so as to generate a driving signal.

Moreover, the video display device 100 shown in FIG. 1 is just one embodiment, and thus some of the components shown in FIG. 1 may be integrated, added, or omitted according to the specification of the actually implemented video display device 100.

That is, at least two components may be integrated into one component or one component may be divided into more than two components, if necessary. Additionally, a function performed in each block is used to describe an embodiment of the present invention and its specific operation or device does not limit the scope of the present invention.

According to another embodiment of the present invention, unlike those shown in FIG. 1, the video display device 100 may not include the tuner 131 and the demodulation unit 132 and may receive an image through the network interface unit 133 or the external device interface unit 1235 and may then play it.

For example, the video display device 100 may be divided into an image processing device such a settop box for receiving broadcast signals or contents according to various networks and a contents playback device playing contents inputted from the image processing device.

In this case, an image displaying method described below according to an embodiment of the present invention may be performed by one of the image processing device such as a separated settop box or the contents playback device including the display unit 180 and the audio output unit 185 in addition to the video display device 100 described with reference to FIG. 1.

Then, a remote control device according to an embodiment of the present invention will be described with reference to FIGS. 2 to 3.

Figure 2:
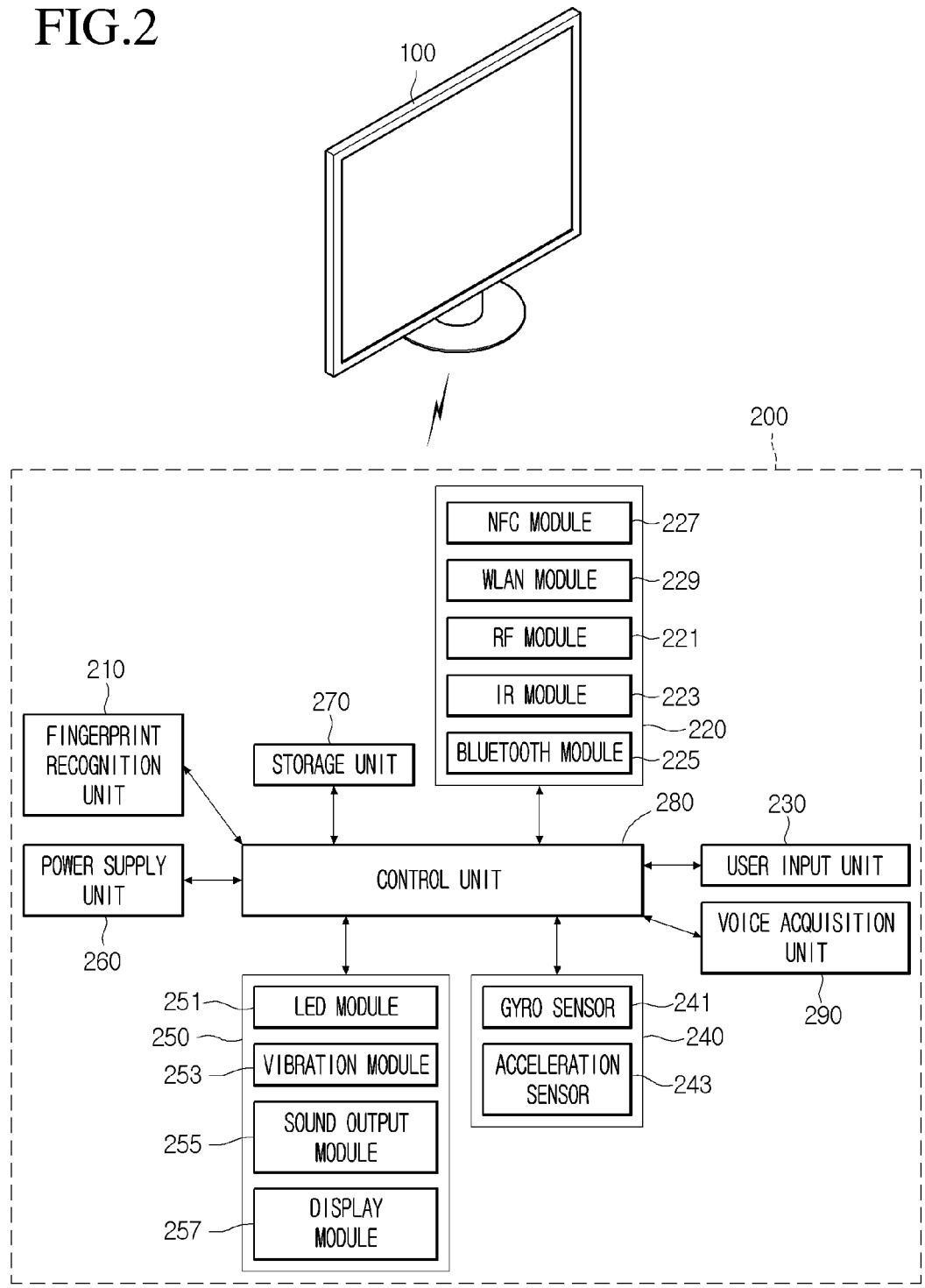
FIG. 2 is a block diagram of a remote control device according to an embodiment of the present invention.
Figure 3:
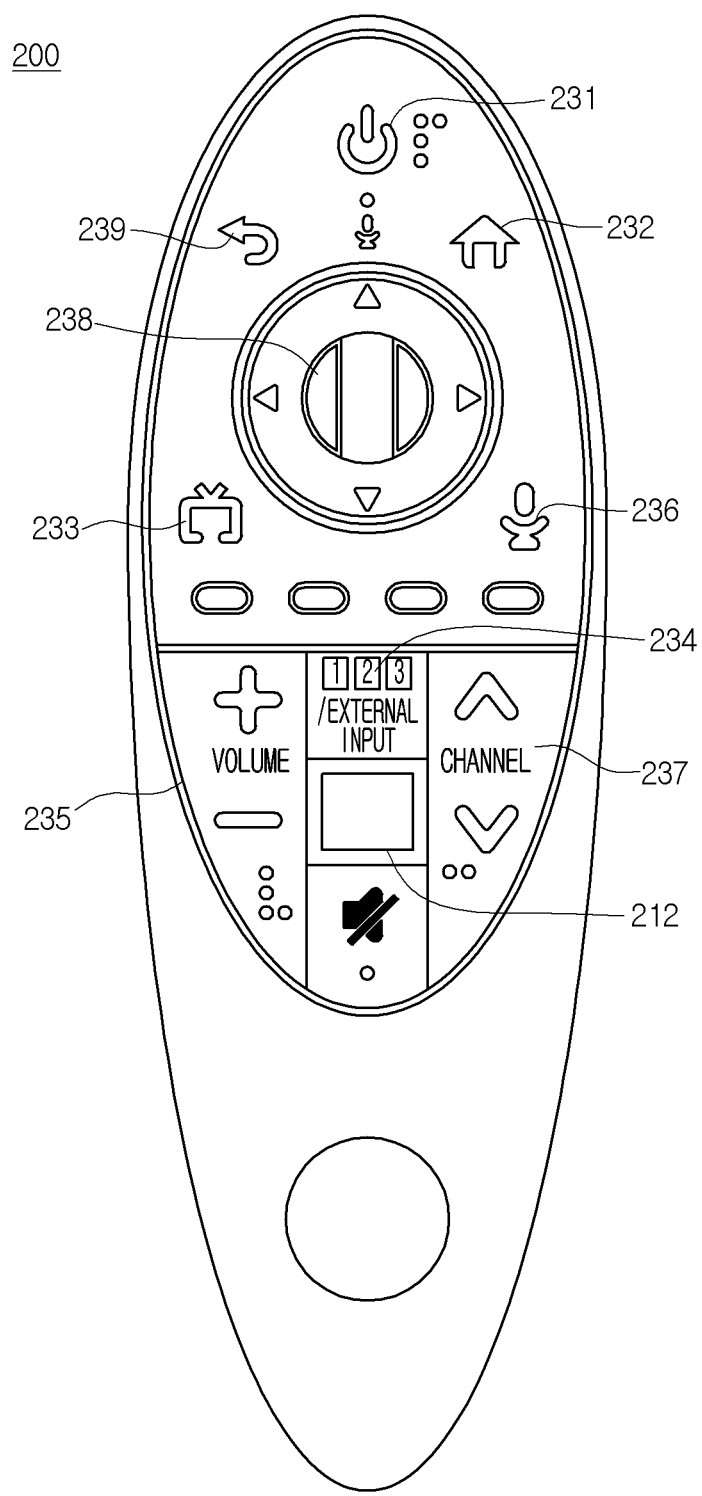
FIG. 3 is a block diagram illustrating an actual configuration of a remote control device according to an embodiment of the present invention.

FIG. 2 is a block diagram of a remote control device 200 according to an embodiment of the present invention and FIG. 3 is a view illustrating actual configuration of a remote control device 200 according to an embodiment of the present invention.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the fingerprint recognition unit 210 may receive a fingerprint input of a user. Then, the fingerprint recognition unit 210 may recognize the inputted fingerprint.

The wireless communication unit 225 may transmit/receive a signal to/from an arbitrary one among video display devices according to the above-mentioned embodiments of the present invention.

The remote control device 200 may include an RF module 221 transmitting/receiving a signal to/from the video display device 100 according to the RF communication standard and an IR module 223 transmitting/receiving a signal to/from the video display device 100 according to the IR communication standard. Additionally, the remote control device 200 may include a Bluetooth module 225 transmitting/receiving a signal to/from the video display device 100 according to the Bluetooth communication standard. Moreover, the remote control device 200 may include an NFC module 227 transmitting/receiving a signal to/from the video display device 100 according to the NFC communication standard and may also include a WLAN module 229 transmitting/receiving a signal to/from the video display device 100 according to the WLAN communication standard.

Moreover, the remote control device 200 may transmit a signal containing information on a movement of the remote control device 200 to the video display device 100 through the wireless communication unit 220.

Furthermore, the remote control device 200 may receive a signal that the video display device 100 transmits through the wireless communication unit 220 and if necessary, may transmit an instruction on power on/off, channel change, and volume change to the video display device 100 through the wireless communication unit 220.

The user input unit 230 may be configured with a keypad, a button, a touch pad, or a touch screen. A user may manipulate the user input unit 230 and may input an instruction relating to the video display device 100 to the remote control device 200. When the user input unit 230 is equipped with a hard key button, a user may input an instruction relating to the video display device 100 to the remote control device 200 through a push operation of the hard key button. This will be described with reference to FIG. 3.

Referring to FIG. 3, the remote control device 200 may include a plurality of buttons. The plurality of buttons may include a fingerprint recognition button 212, a power button 231, a home menu button 232, a LIVE button 233, an external input button 234, a volume button 235, a voice recognition button 236, a channel button 237, a wheel button 238, and a cancel button 239.

The fingerprint recognition button 212 may be a button for recognizing a user's fingerprint. According to an embodiment of the present invention, the fingerprint recognition button 212 may be possible for a push operation and may receive a push operation and a fingerprint recognition operation.

The power button 231 may be a button for turning on/off the video display device 100.

The home menu button 232 may be a button for displaying a menu screen of the video display device 100.

The LIVE button 233 may be a button for displaying a real-time broadcast program.

The external input button 234 may be a button for displaying an external input image.

The volume button 235 may be a button for adjusting the volume of the video display device 100.

The voice recognition button 235 may be a button for recognizing a user's voice.

The channel button 237 may be a button for receiving a broadcast signal of a specific broadcast channel.

The wheel button 238 may be a button for receiving a user input for rotating a wheel and may be possible for a push operation for pushing a wheel.

The cancel button 239 may be a button for receiving a user input for returning to a previous step or canceling a specific operation.

Again, FIG. 2 will be described.

When the user input unit 230 is equipped with a touch screen, a user may input an instruction relating to the video display device 100 to the remote control device 200 through soft key touch of the touch screen. Additionally, the user input unit 230 may include various kinds of input means that a user manipulates, for example, a scroll key or a jog key, and this embodiment does not limit the scope of the present invention.

The sensor unit 240 may include a gyro sensor 241 or an acceleration sensor 243 and the gyro sensor 241 may sense information on a movement of the remote control device 200.

For example, the gyro sensor 231 may sense information on a movement of the remote control device 200 on the basis of x, y, and z axes and the acceleration sensor 243 may sense information on the movement speed of the remote control device 200. Moreover, the remote control device 200 may further include a distance measurement sensor and thus may sense a distance to the display unit 180 of the video display device 100.

The output unit 250 may output an image or voice signal corresponding to a manipulation of the user input unit 235 or corresponding to a signal that the video display device 100 transmits. A user may recognize whether the user input unit 235 is manipulated or whether the video display device 100 is controlled through the output unit 250.

For example, the output unit 250 may include an LED module 252 flashing when the user input unit 230 is manipulated or a signal is transmitted from the video display device 100 through the wireless communication module 220, a vibration module 253 generating vibration, a sound output module 255 outputting sound, or a display module 257 outputting an image.

Moreover, the power supply unit 260 supplies power to the remote control device 200 and when the remote control device 200 does not move for a predetermined time, stops power supply, so that power waste may be reduced. The power supply unit 260 may resume the power supply when a predetermined key equipped at the remote control device is manipulated.

The storage unit 270 may store several types of programs and application data necessary for a control or operation of the remote control device 200. If the remote control device 200 transmits a signal wirelessly through the video display device 100 and the RF module 221, the remote control device 200 and the video display device 100 transmit/receive signal through a predetermined frequency band.

Moreover, the storage unit 270 may store user's bio information. Then, the storage unit 270 may store information on a pattern input that a user inputs.

The control unit 280 of the remote control device 200 may store information on a frequency band for transmitting/receiving a signal wirelessly to/from the video display device 100 paired with the remote control device 200 and may then refer it.

The control unit 280 may control general matters relating to a control of the remote control device 200. The control unit 280 may transmit to the video display device 100 through the wireless communication unit 220, a signal corresponding to a predetermined key manipulation of the user input unit 230 or a signal corresponding to a movement of the remote control device 200 that the sensor unit 240 senses.

The control unit 280 may process inputted user's bio information. For example, the control unit 280 may store information on the inputted user's fingerprint in the storage unit 270. Additionally, the control unit 280 may transmit a fingerprint image on the inputted user's fingerprint to the video display device 100 through the wireless communication unit 220.

For example, the control unit 280 may transmit the information on a user's fingerprint inputted through the fingerprint recognition unit 210 to the video display device 100, so that the control unit 170 of the video display device 100 stores the information on the inputted user's fingerprint in the storage unit 140.

Additionally, the voice acquisition unit 290 of the remote control device 200 may obtain a voice.

The voice acquisition unit 290 may include at least one mike 291 and thus, may obtain a voice through the included mike 291.

Then, the voice acquisition unit 290 may deliver the obtained voice to the control unit 280.

The voice acquisition unit 290 may include a mike (not shown) equipped at the front of the remote control device 200 and thus, may obtain a voice through the mike.

The voice acquisition unit 290 may include a plurality of mikes 291 and thus, may obtain a voice through each of the plurality of mikes 291.

According to an embodiment of the present invention, as a mike is equipped on at least one of the front, side, and rear of the remote control device 200, the voice acquisition unit 290 may obtain a voice through at least one equipped mike.

Moreover, the remote control device 200 may be one of a space remote controller, a smartphone, and a smart pad but is not limited thereto.

Hereinafter, an operating method of the video display device 100 will be described with reference to FIGS. 4 to 18.

Figure 4:
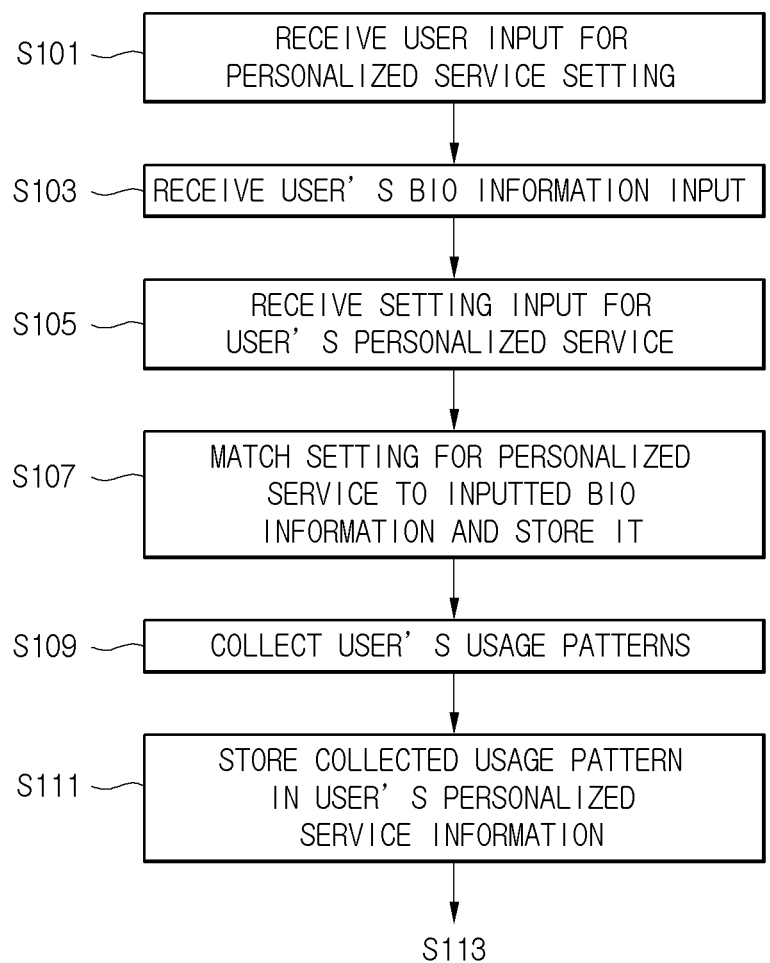
FIGS. 4 and 5 are flowcharts illustrating an operating method of a video display device according to an embodiment of the present invention.
Figure 5:
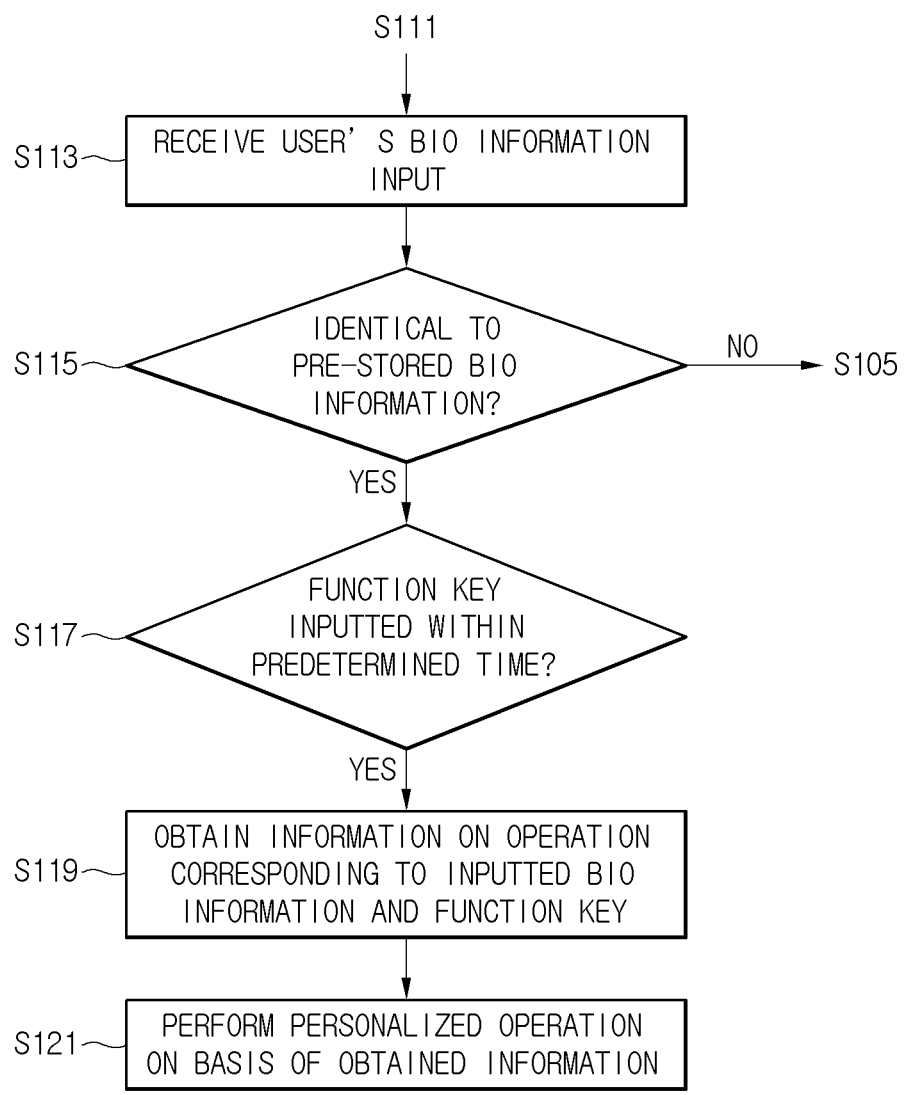

FIGS. 4 and 5 are flowcharts illustrating an operating method of the video display device 100 according to an embodiment of the present invention.

Referring to FIG. 4, the control unit 170 of the video display device 100 receives a user input for personalized service setting in operation S101.

The control unit 170 of the video display device 100 may receive a user input for user's personalized service setting. According to an embodiment of the present invention, the video display device 100 may receive a user input for user's personalized service setting from a user through the user input interface unit 150.

Herein, the personalized service setting may include at least one setting for functions that a user frequently uses, applications that a user frequently uses, external inputs that a user frequently uses, menus that a user frequently uses, channels and contents that a user frequently views, and setting values that a user sets. Additionally, the personalized service setting may include a setting for user input for executing at least one of personalized functions and personalized menus for a user.

Moreover, upon the receipt of a user input for personalized service setting, the control unit 170 of the video display device 100 may display a screen for personalized service setting on the display unit 180.

The control unit 170 of the video display device 100 receives at least one of a user's bio information input and pattern input in operation S103.

The control unit 170 of the video display device 100 may receive bio information, that is, unique information relating to a user's body or a pattern having a predetermined form. Herein, the bio information may include at least one of a user's fingerprint, iris, vein, face, and voice. Then, the pattern input may include at least one of a user's predetermined gesture operation, specific input, specific form input, specific path input, and specific voice speech.

According to an embodiment of the present invention, the control unit 170 of the video display device 100 may display a screen for receiving a user's fingerprint input and then may receive a user's fingerprint input.

This will be described with reference to FIGS. 6 and 7.

Figure 6:
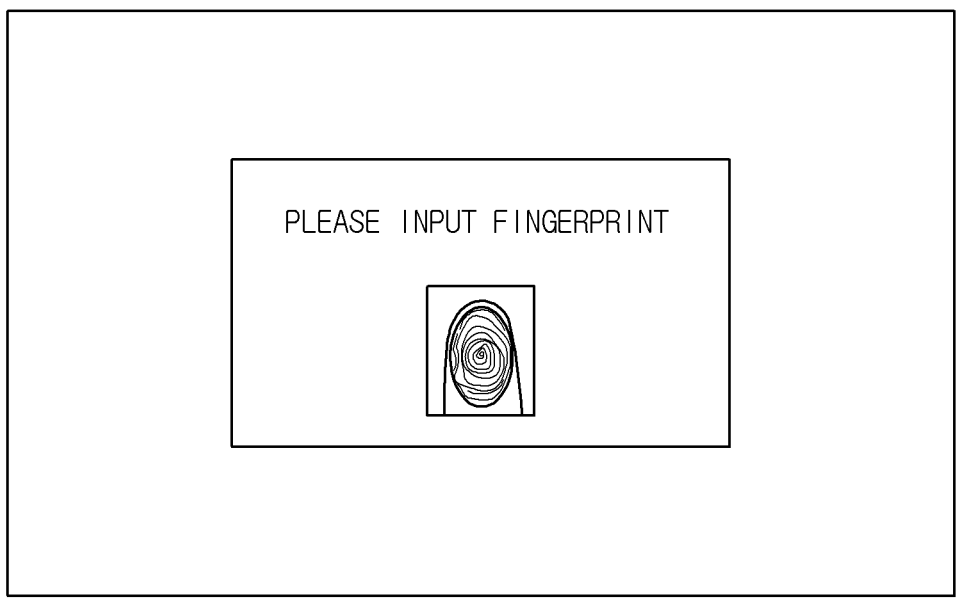
FIG. 6 is a view illustrating a screen for user fingerprint input according to an embodiment of the present invention.

FIG. 6 is a view illustrating a screen for user's fingerprint input according to an embodiment of the present invention.

Figure 7:
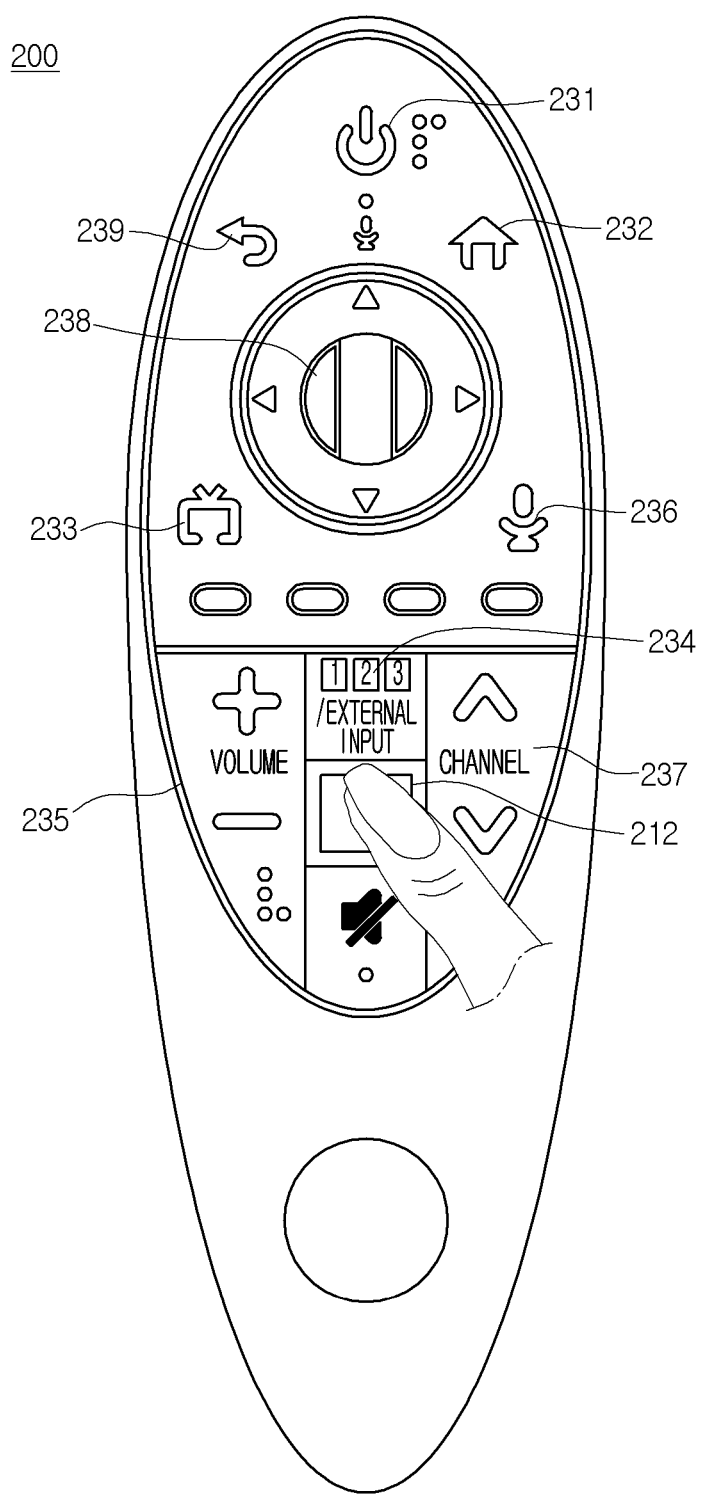
FIG. 7 is a view illustrating a user fingerprint input according to an embodiment of the present invention.

FIG. 7 is a view illustrating a user's fingerprint input according to an embodiment of the present invention.

Referring to FIG. 6, the control unit 170 of the video display device 100 may display a screen for user's fingerprint input on the display unit 180. Additionally, the control unit 170 of the video display device 100 may display a screen for the degree of a user's fingerprint input on the display unit 180.

Then, the control unit 170 of the video display device 100 may receive a user's fingerprint input.

Referring to FIG. 7 as an embodiment, the remote control device 200 may receive a user's fingerprint input through the fingerprint input button 212. For example, the control unit 280 may store information on the inputted user's fingerprint in the storage unit 100. Accordingly, the control unit 170 of the video display device 100 may receive information on a user's fingerprint. Herein, the information on a user's fingerprint may include a user's fingerprint image.

According to another embodiment of the present invention, the video display device 100 may receive a user's fingerprint input through the user input interface unit 150. The control unit 170 of the video display device 100 may receive a user's fingerprint input through a fingerprint input key (not shown) included in the user input interface unit 150.

Additionally, upon the receipt of the user's fingerprint input, the control unit 170 of the video display device 100 may display a screen for notifying that the user's fingerprint input is received.

Furthermore, the control unit 170 of the video display device 100 may receive another bio information input other than a user's fingerprint. For example, the control unit 170 may receive a user's iris recognition input by obtaining it through the image acquisition unit 120. For another example, the control unit 170 may receive a user's face recognition input by obtaining a user's image through the image acquisition unit 120. For another example, the control unit 170 may receive a user's voice recognition input by obtaining a user's voice through the voice acquisition unit 110. For another example, the control unit 170 may receive a user's vein recognition input by obtaining it through the image acquisition unit 120. Additionally, the control unit 170 of the video display device 100 may receive a user's pattern input. For example, the control unit 170 may receive a user's pattern input by receiving a specific key input through the user input interface unit 150. For another example, the control unit 170 may receive a pattern input according to a user's specific gesture operation by obtaining an image for a user's gesture operation from the image acquisition unit 120. For another example, the control unit 170 may receive a pattern input according to a user's specific voice speech by obtaining a user's voice through the voice acquisition unit 110. For another example, the control unit 170 may obtain a user input for inputting a specific path through the user input interface unit 150.

In such a manner, the control unit 170 of the video display device 100 may receive user's various bio information inputs through known techniques in addition to the above embodiments or techniques easy for those skilled in the art.

Again, FIG. 4 will be described.

The control unit 170 of the video display device 100 receives a setting input for user's personalized service in operation S105.

The control unit 170 of the video display device 100 may receive a user input for setting a user's personalized service. According to an embodiment of the present invention, the video display device 100 may receive a user input for setting a user's personalized service from a user through the user input interface unit 150. According to another embodiment of the present invention, the video display device 100 may receive a user input for setting a user's personalized service from a user through the remote control device 200. In more detail, the control unit 170 of the video display device 100 may receive a user input for setting a personalized service from the control unit 280 of the remote control device 200.

Herein, the personalized service setting may include at least one setting for functions that a user frequently uses, applications that a user frequently uses, external inputs that a user frequently uses, menus that a user frequently uses, channels and contents that a user frequently views, and setting values that a user sets. Additionally, the personalized service setting may include a setting for user input for executing at least one of personalized functions and personalized menus for a user.

According to an embodiment of the present invention, the control unit 170 may receive setting for functions that a user frequently uses, applications that a user frequently uses, external inputs that a user frequently uses, menus that a user frequently uses, channels and contents that a user frequently views, and setting values that a user sets. Moreover, the control unit 170 may receive a setting for user input to display a list for functions that a user frequently uses, applications that a user frequently uses, external inputs that a user frequently uses, menus that a user frequently uses, channels and contents that a user frequently views, and setting values that a user sets. Furthermore, the control unit 170 may receive a setting for user input to display a menu or list for functions that a user frequently uses, applications that a user frequently uses, external inputs that a user frequently uses, menus that a user frequently uses, channels and contents that a user frequently views, and setting values that a user sets.

This will be described with reference to FIGS. 8 and 11.

FIGS. 8 to 11 are views illustrating a screen of a personalized service setting according to an embodiment of the present invention.

Figure 8:
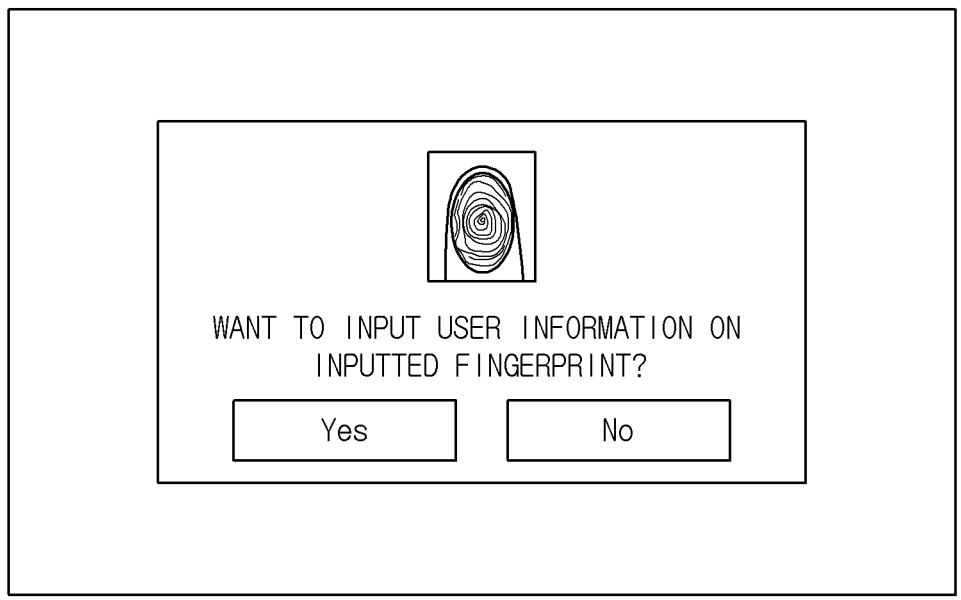

Referring to FIG. 8, the control unit 170 may receive a user input for selecting a user information input corresponding to an inputted user's fingerprint. Accordingly, upon the receipt of a user input for selecting a user information input, the control unit 170 may receive a user input for setting the above-mentioned personalized service. Moreover, when another bio information other than a user's fingerprint is inputted, the control unit 170 may receive a user input for selecting a user information input.

Then, referring to FIG. 9, the control unit 170 may receive a user information input including the user's name and ID corresponding to an inputted user's fingerprint. Additionally, the control unit 170 may receive a user input for a user's personalized function setting that inputs user information and a function key input time setting described later.

Figure 10:
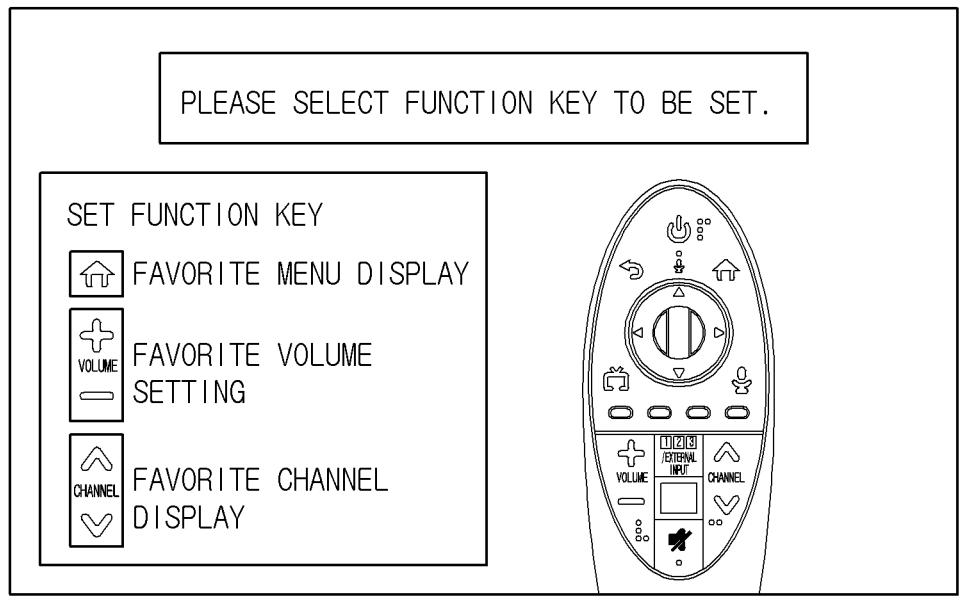

Then, referring to FIG. 10, when receiving a user input for function key input, the control unit 170 may display an image for a function key of the remote control device 200, a predetermined function key, and a personalized operation corresponding to the predetermined function key.

Then, referring to FIG. 11, the control unit 170 may receive a user input for setting a time in which a function key providing a personalized operation to a user is inputted after a user's bio information input.

Moreover, during a user input for personalized service, the control unit 170 may display on the display unit 180 information on functions that a user frequently uses, applications that a user frequently uses, external inputs that a user frequently uses, menus that a user frequently uses, channels and contents that a user frequently views, and setting values that a user sets. In more detail, the control unit 170 may display at least one of functions that a user frequently uses, applications that a user frequently uses, external inputs that a user frequently uses, menus that a user frequently uses, a list for channels and contents that a user frequently views, usage count, and frequency of use. Additionally, the control unit 180 may display at least one of a list for setting values that a user sets, numerical values, and an applied screen.

The control unit 170 of the video display device 100 matches a setting for an inputted personalized service to at least one of inputted bio information and pattern input and then stores it in operation S107.

The control unit 170 of the video display device 100 matches the setting for a user's personalized service inputted in operation S105 to at least one of the user's bio information and pattern input inputted in operation S103 and then stores it.

For example, Furthermore, the control unit 170 may match a setting for an inputted user's personalized service, for example, functions that a user frequently uses, applications that a user frequently uses, external inputs that a user frequently uses, menus that a user frequently uses, channels and contents that a user frequently views, settings and personalized functions for a setting value that a user sets, and settings for user input to execute at least one in a personalized menu, to an inputted user's fingerprint image and may then store it.

Accordingly, the control unit 170 of the video display device 100 may match a setting for personalized service for each of a plurality of users to each fingerprint of the plurality of users and may then store it.

Moreover, as matching a setting for personalized service to a user's fingerprint and then storing it, the control unit 170 may display on the display unit 180 a screen notifying that the setting for personalized service is stored.

This is described with reference to FIG. 12.

Figure 12:
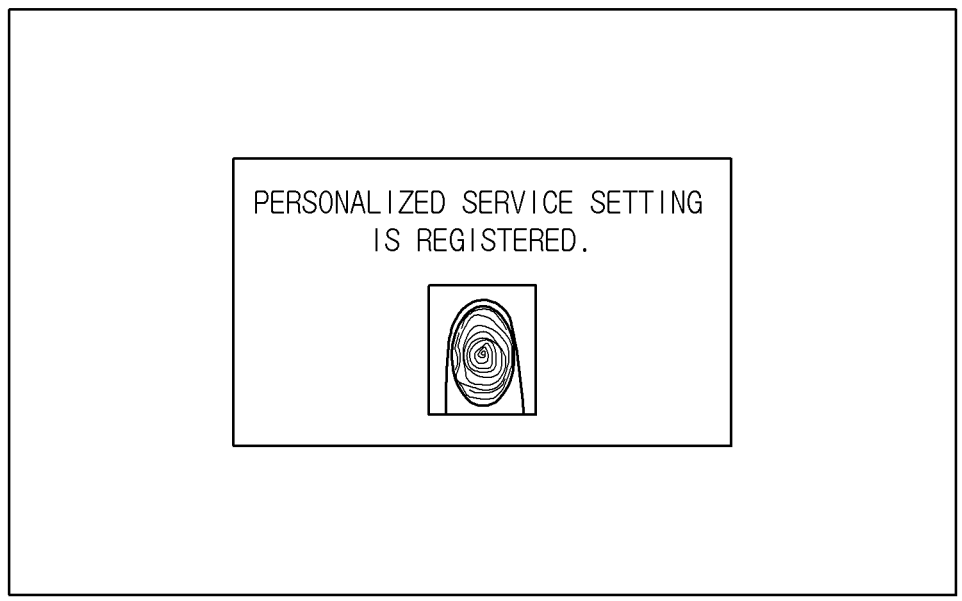
FIG. 12 is a view illustrating a personalized service setting registration according to an embodiment of the present invention.

FIG. 12 is a view illustrating a personalized service setting registration according to an embodiment of the present invention.

Referring to FIG. 12, as a personalized service setting for a user who inputs the fingerprint is stored, the control unit 170 may display on the display unit 180 a screen notifying that the personalized service setting is registered.

Moreover, the above description for personalized service setting registration is just an example. Therefore, the control unit 170 may match a setting for inputted personalized service to various bio information other than a fingerprint, that is, one of user's bio information, and may then store it. Then, the control unit 170 may match a setting for inputted personalized service to a user's pattern input and may then store it. Additionally, the control unit 170 may match a setting for inputted personalized service to a user's bio information and pattern input and may then store it.

Additionally, the control unit 170 may display personalized service setting contents on the personalized service setting registration screen.

Again, FIG. 4 will be described.

The control unit 170 of the video display device 100 collects information on a user's image display usage pattern in operation S109.

The control unit 170 of the video display device 100 may collect information on the user's usage pattern of the video display device 100 where the setting for personalized service is stored in operation S107.

According to an embodiment of the present invention, the control unit 170 may collect information on at least one of a pattern for function usage, a broadcast viewing pattern, a contents viewing pattern, a pattern for menu usage, a setting value setting pattern, and a pattern for application usage, which relate to a user's video display device storing a setting for personalized service.

The control unit 170 of the video display device 100 stores the collected information on a usage pattern in the user's personalized service information in operation S111.

The control unit 170 may store, in the user's personalized service information, the collected information (in operation S109) on at least one of a pattern for function usage, a broadcast viewing pattern, a contents viewing pattern, a pattern for menu usage, a setting value setting pattern, and a pattern for application usage, which relate to a user's video display device.

For example, information on a user's fingerprint, setting information on personalized service, and usage pattern information of a video display device are matched to a user who inputs at least one of bio information and pattern input and stored in the storage unit 140 of the video display device 100.

Then, FIG. 5 will be referred.

The control unit 170 of the video display device 100 receives at least one of the user's bio information and pattern input in operation S113 and determines whether at least one of the user's received bio information and pattern input is identical to at least one of the user's pre-stored bio information and pattern input in operation S115.

The control unit 170 of the video display device 100 may receive at least one of user's various bio information inputs and pattern inputs and may then determine whether at least one of the inputted user's various bio information and the inputted user's patterns is identical to the user's pre-stored bio information.

According to an embodiment of the present invention, the control unit 170 of the video display device 100 may input a user's fingerprint through the fingerprint input button 212 of the remote control device 200 or the user input interface unit 150. For example, the control unit 170 of the video display device 100 may receive an inputted user's fingerprint image from the control unit 280 of the remote control device 200. Contents for a user fingerprint input of the video display device 100 are described above and thus, its detailed description is omitted.

Then, the control unit 170 may determine an inputted user's fingerprint is identical to a pre-stored at least one user's fingerprint by comparing an inputted user's fingerprint image with a user's pre-stored fingerprint image.

Moreover, if the inputted user's bio information is not identical to the user's pre-stored bio information, the control unit 170 may proceed to operation S105 and may then receive a setting input for user's personalized service.

Moreover, if the inputted user's bio information is identical to the user's pre-stored bio information, the control unit 170 may perform a log-in operation for a user corresponding to the inputted bio information.

Description for the user's bio information input is exemplary and thus, it is possible to determine whether a user's pattern input other than a bio information input is identical to a user's pre-stored pattern input.

If at least one of the inputted user's bio information and pattern input is identical to at least one of the user's pre-stored bio information and pattern input, when receiving a user input for inputting a function key in a predetermined time in operation S117, the control unit 170 of the video display device 100 obtains information on at least one of the inputted user's bio information and pattern input and an operation corresponding to an inputted function key in operation S119. Then, the control unit 170 of the video display device 100 performs a personalized operation on the basis of information on the obtained operation in operation S121.

According to an embodiment of the present invention, when receiving a user's fingerprint input and a user input for a function key input within a predetermined time, the control unit 170 of the video display device 100 may obtain information on an operation corresponding to the inputted fingerprint and function key.

In more detail, the control unit 170 of the video display device 100 may obtain user's personalized service information corresponding to the inputted fingerprint. Then, the control unit 170 may obtain information on an operation corresponding to the inputted function key on the basis of the obtained user's personalized service information.

This will be described with reference to FIGS. 13 and 16.

FIGS. 13 to 16 are views of a guide screen for user's function key input.

Figure 13:
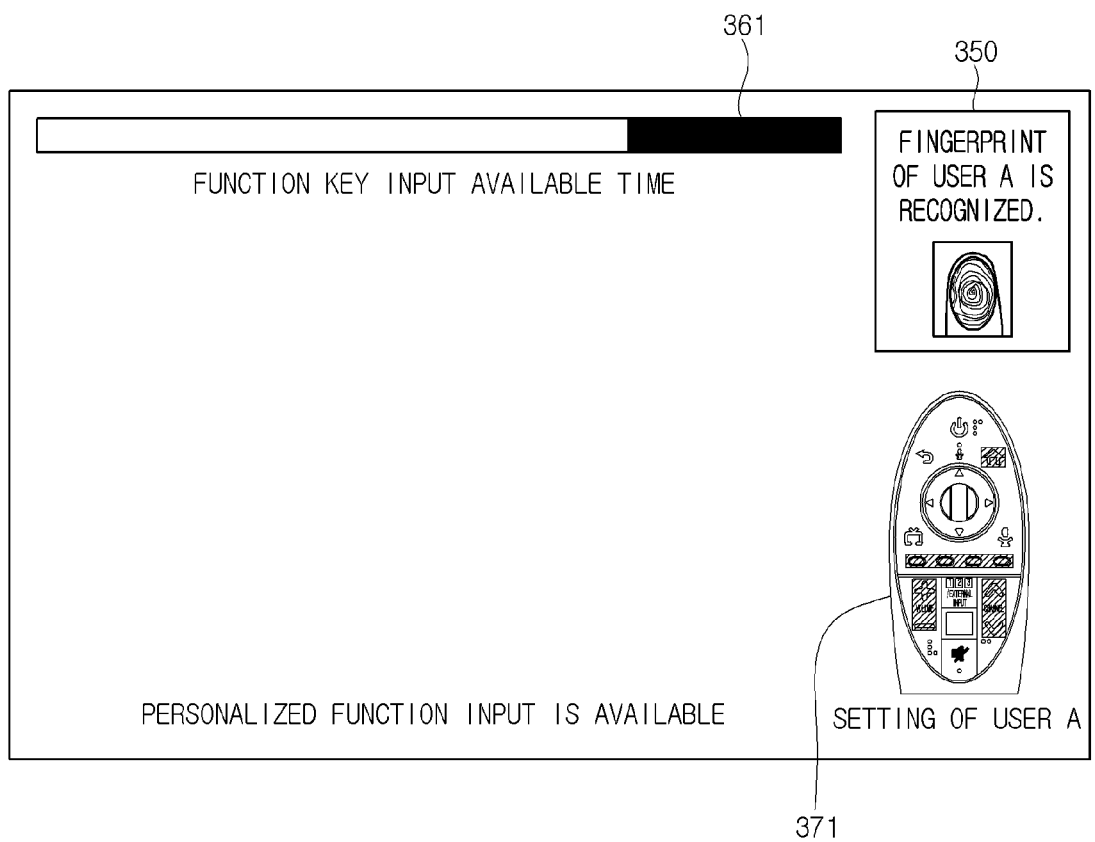
FIGS. 13 to 16 are views of a guide screen for user's function key input.

According to an embodiment of the present invention, referring to FIG. 13, if the inputted fingerprint, that is, user's bio information, is identical to the pre-stored user fingerprint, the control unit 170 may display an information window 350, which represents that the user's bio information corresponding to the inputted fingerprint is inputted, through the display unit 180. Additionally, the control unit 170 may display a predetermined time in which a function key input is possible as a bar 361. Then, the control unit 170 may change the color or contrast of a partial area of the bar 361 as a time elapses after the bio information is inputted.

Figure 14:
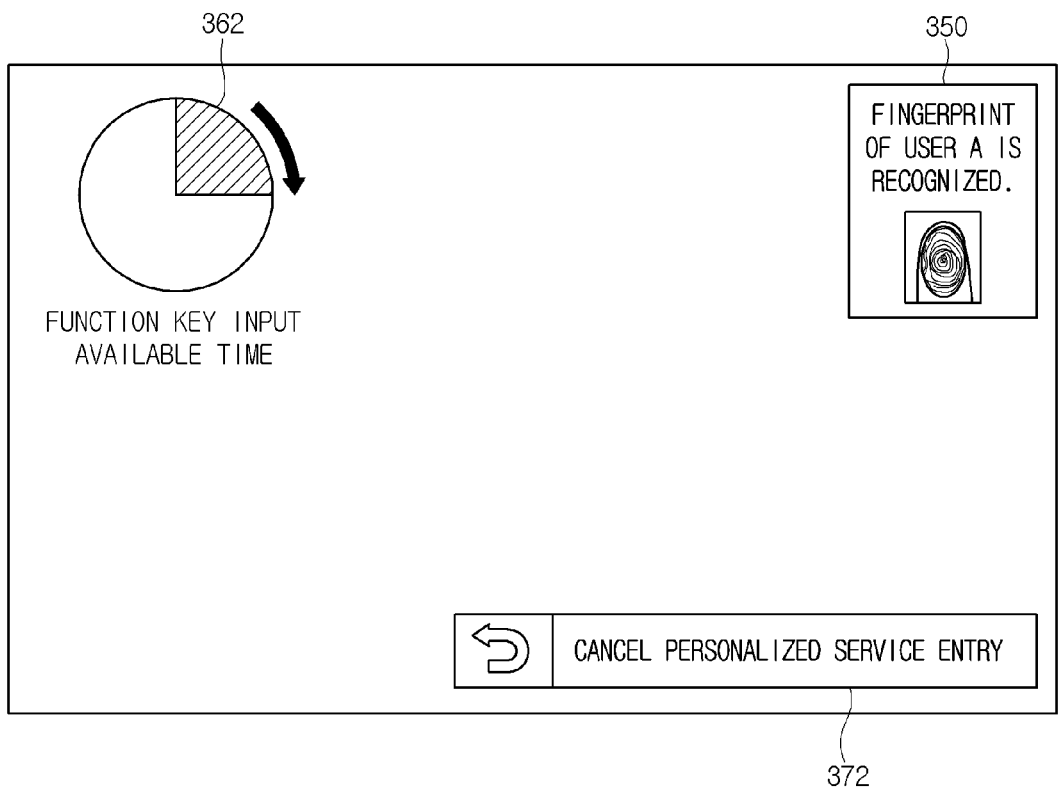

According to another embodiment of the present invention, referring to FIG. 14, if the inputted fingerprint, that is, user's bio information, is identical to the pre-stored user fingerprint, the control unit 170 may display an information window 350, which represents that the user's bio information corresponding to the inputted fingerprint is inputted, through the display unit 180. Additionally, the control unit 170 may display a predetermined time in which a function key input is possible as a circle graph 362. Then, the control unit 170 may change the color or contrast of a partial area of the circle graph 362 as a time elapses after the bio information is inputted.

Additionally, the control unit 170 may display a menu or guide information for user input to cancel a personalized service entry, on the display unit 180. For example, as shown in FIG. 14, an information window 372 displaying that the cancel button 238 of the remote control device 200 can be pushed for canceling the personalized service entry.

Additionally, upon the receipt of a user input for canceling a user's personalized service entry, the control unit 170 may switch into a normal mode even if a predetermined time is not reached. Herein, the normal mode means a mode in which a personalized function does not operate or a personalized menu is not displayed. Accordingly, the normal mode may be a mode in which the video display device 100 performs a general operation. Thus, the control unit 180 of the video display device 100 in the normal mode does not provide a personalized function or a personalized menu and provides a function or menu available for all users, that is, a function or menu of a general video display device.

Figure 15:
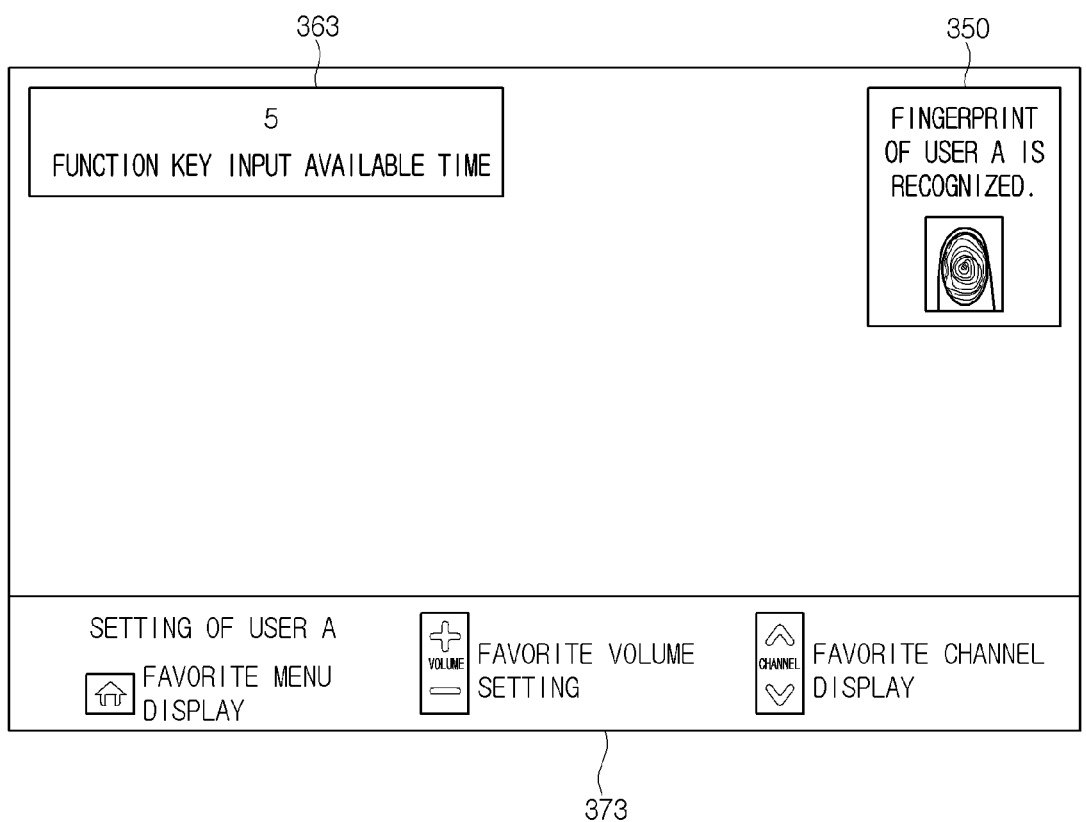

According to another embodiment of the present invention, referring to FIG. 15, if the inputted fingerprint, that is, user's bio information, is identical to the pre-stored user fingerprint, the control unit 170 may display an information window 350, which represents that the user's bio information corresponding to the inputted fingerprint is inputted, through the display unit 180. Additionally, the control unit 170 may display a predetermined time in which a function key input is possible as a number window 363. Then, the control unit 170 may change and display the number displayed on the number window 363 as a time elapses after the bio information is inputted.

Additionally, the control unit 170 may display information on a personalized function or menu corresponding to a function key input that a user sets, on the display unit 180. For example, as shown in FIG. 15, the information window 373 representing information on a personalized operation corresponding to a function key input that a fingerprint recognized user sets may be displayed.

Figure 16:
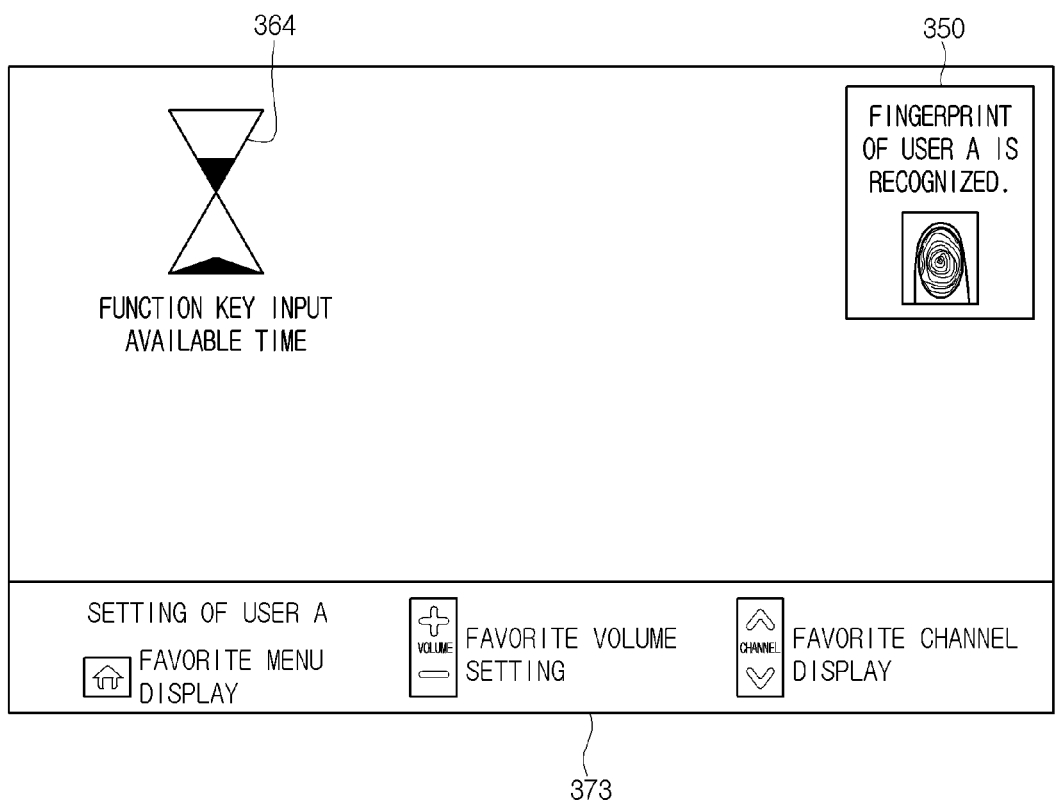

According to another embodiment of the present invention, referring to FIG. 16, if the inputted fingerprint, that is, user's bio information, is identical to the pre-stored user fingerprint, the control unit 170 may display an information window 350, which represents that the user's bio information corresponding to the inputted fingerprint is inputted, through the display unit 180. Additionally, the control unit 170 may display a predetermined time in which a function key input is possible as a sandglass 364. Then, the control unit 170 may change and display the remaining sand amount in the sandglass 364 as a time elapses after the bio information is inputted. Additionally, the control unit 170 may display the above-mentioned information window 373.

Moreover, an operation corresponding to an inputted function key may be an operation set during a setting input for a user's personalized service. Then, the control unit 170 of the video display device 100 may receive a user input for function key input through the user input interface unit 150 or the remote control device 200.

The control unit 170 of the video display device 100 may perform an operation personalized to a user who inputs a fingerprint on the basis of the obtained user's personalized service information and the information on the obtained operation. Accordingly, when performing a personalized operation, the control unit 170 may operate on the basis of a setting for a personalized service that a user inputs. Accordingly, when performing a personalized operation, the control unit 170 may operate on the basis of a user's usage pattern.

This will be described with reference to FIGS. 17 and 24.

An embodiment will be described with reference to FIGS. 17 and 18.

Figure 17:
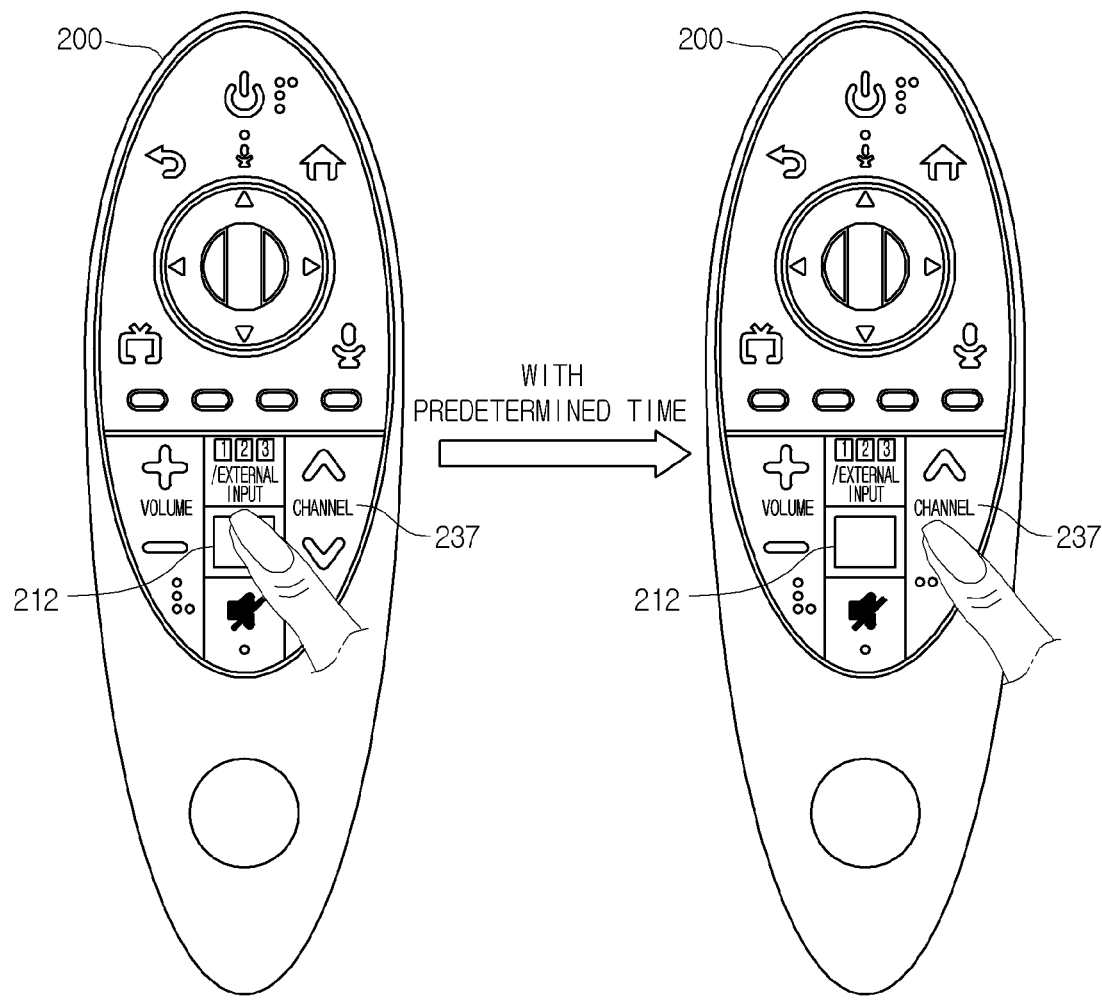
FIG. 17 is a view illustrating a user's function key input according to an embodiment of the present invention.

FIG. 17 is a view illustrating a user's function key input according to an embodiment of the present invention.

Figure 18:
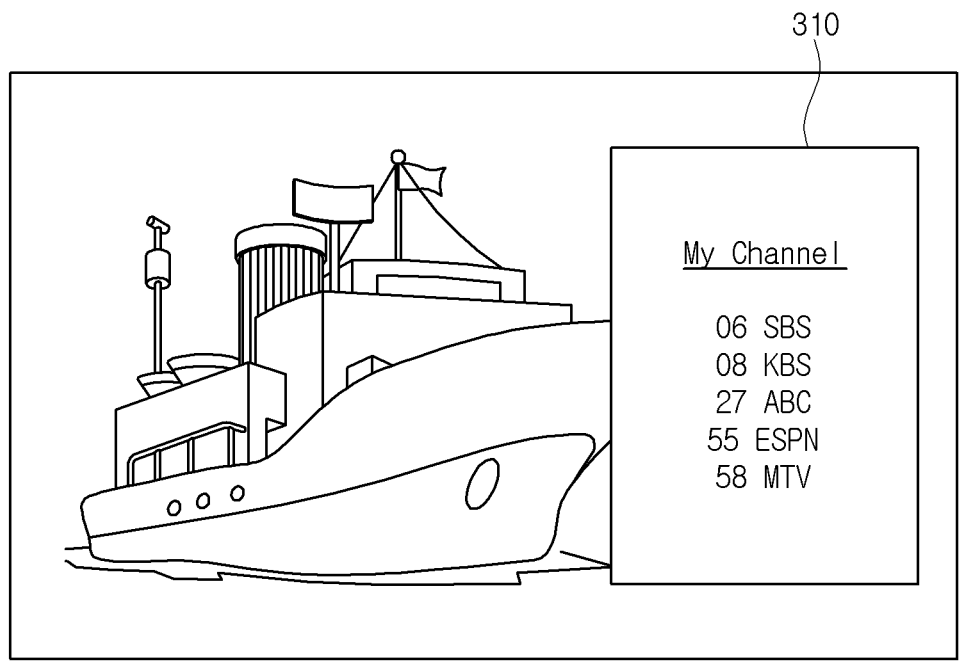
FIG. 18 is a view illustrating a user's favorite channel list according to an embodiment of the present invention.

FIG. 18 is a view illustrating a user's favorite channel list according to an embodiment of the present invention.

According to an embodiment of the present invention, referring to FIG. 17, when receiving a user's fingerprint input from the remote control device 200 and receiving a user input for the channel button 237 from the remote control device 200 within a predetermined time, the control unit 170 of the video display device 100 may obtain information on an operation corresponding to the inputted user fingerprint and channel button 237. Herein, an operation corresponding to the inputted user fingerprint and channel button 237 may be an operation for displaying a user's favorite channel corresponding to the inputted fingerprint. Additionally, the control unit 170 may obtain information on one operation among a favorite channel list display or a switch between favorite channels on the basis of at least one of the intensity of a user input and an input time for the channel button 237. Then, if a user input time for the channel button 237 is long, the control unit 170 may display a list for user's favorite channels. The control unit 170 may obtain a list for favorite channels that a user who inputs a fingerprint views frequently on the basis of the user's collected viewing patterns. Accordingly, as shown in FIG. 18, the control unit 170 may display a list 310 for favorite channels of a user who inputs a fingerprint. Additionally, the control unit 170 may obtain a list for favorite channels of a user who inputs a fingerprint on the basis of a setting for a personalized service that the user inputs. Moreover, if a user input time for the channel button 237 is short, the control unit 170 may perform a channel switching operation for switching into one among a plurality of favorite channels of a user who inputs a fingerprint.

Another embodiment will be described with reference to FIGS. 19 and 20.

Figure 19:
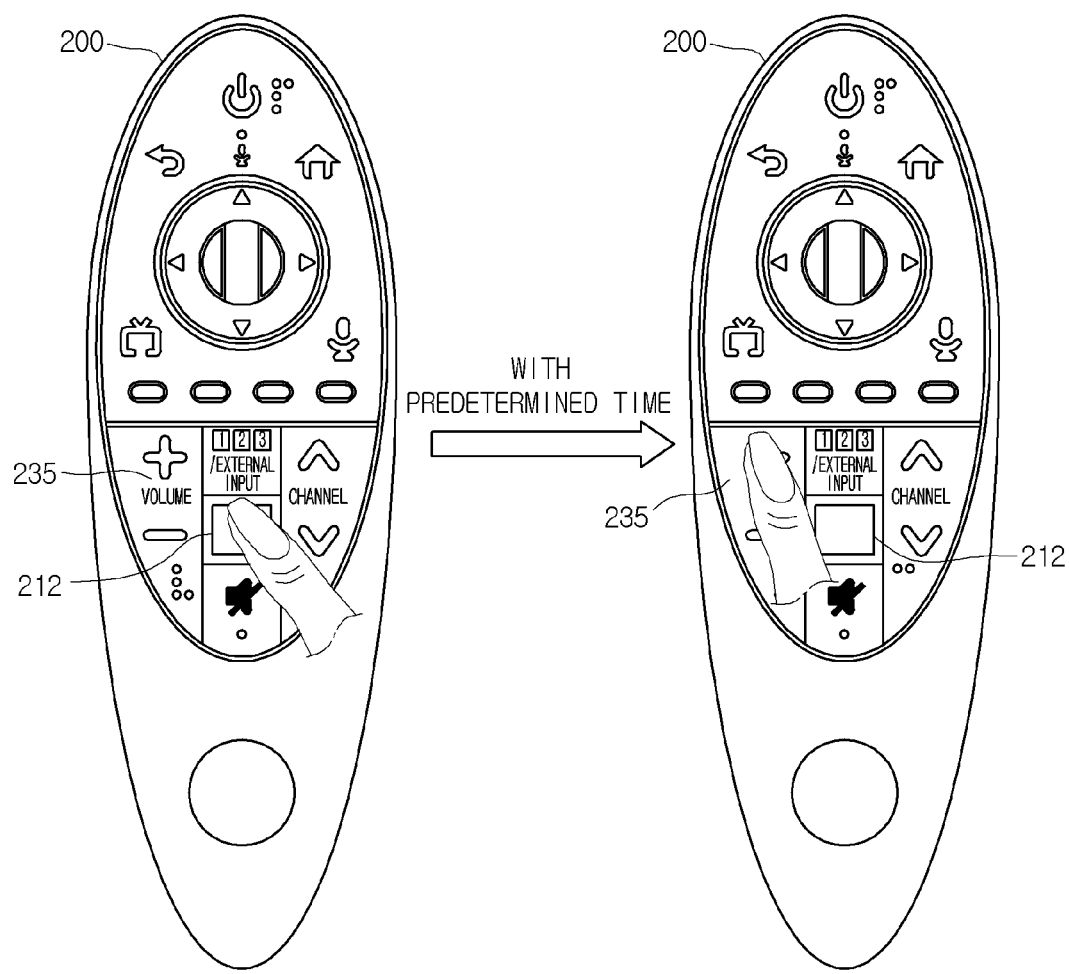
FIG. 19 is a view of a user's function key input according to another embodiment of the present invention.

FIG. 19 is a view of a user's function key input according to another embodiment of the present invention.

Figure 20:
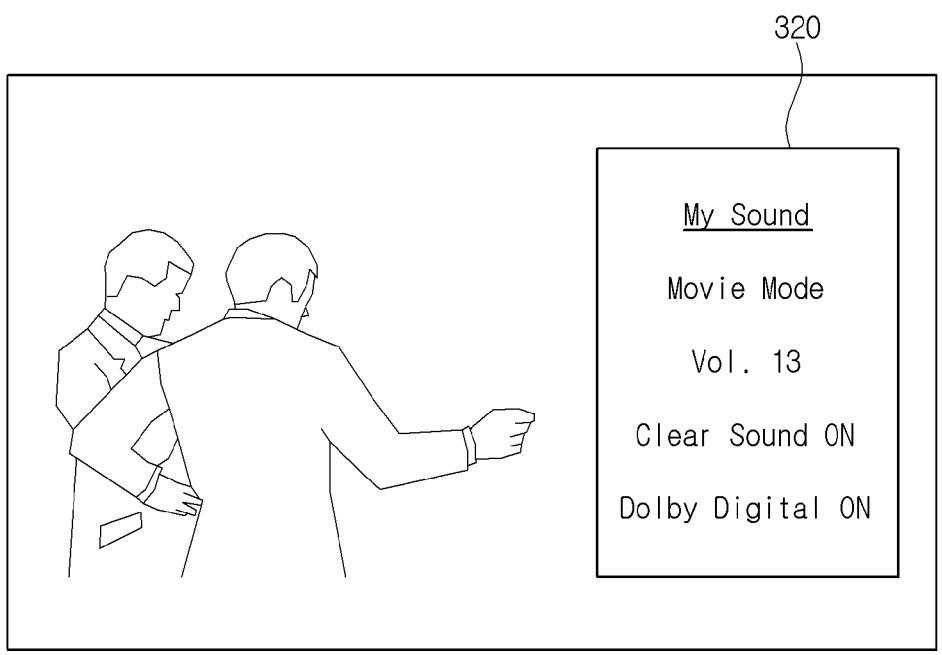
FIG. 20 is a view of a user's audio setting value according to an embodiment of the present invention.

FIG. 20 is a view of a user's audio setting value according to an embodiment of the present invention.

According to an embodiment of the present invention, referring to FIG. 19, when receiving a user's fingerprint input from the remote control device 200 and receiving a user input for the volume button 235 from the remote control device 200 within a predetermined time, the control unit 170 of the video display device 100 may obtain information on an operation corresponding to the inputted user fingerprint and volume button 235. Herein, an operation corresponding to the inputted user fingerprint and volume button 235 may be an operation for setting an audio of the video display device 100 with an audio setting value that a user corresponding to the inputted fingerprint inputs. Additionally, the control unit 170 may obtain information on one operation among an audio setting or a display of a list for audio setting values that a user inputs on the basis of at least one of the intensity of a user input and an input time for the volume button 235. Then, if a user input time for the volume button 235 is long, the control unit 170 may display a list for audio setting values that a user sets. The control unit 170 may obtain a list for audio setting values of a user who inputs a fingerprint on the basis of the user's collected audio setting patterns. Accordingly, as shown in FIG. 20, the control unit 170 may display an audio setting value list 320 of a user who inputs a fingerprint. Additionally, the control unit 170 may obtain an audio setting value list for a user who inputs a fingerprint on the basis of a setting for a personalized service that the user inputs. Moreover, if a user input time for the volume button 235 is short, the control unit 170 may perform an operation for setting an audio with an audio setting value that a user, who inputs a fingerprint, inputs.

Another embodiment will be described with reference to FIGS. 21 and 22.

Figure 21:
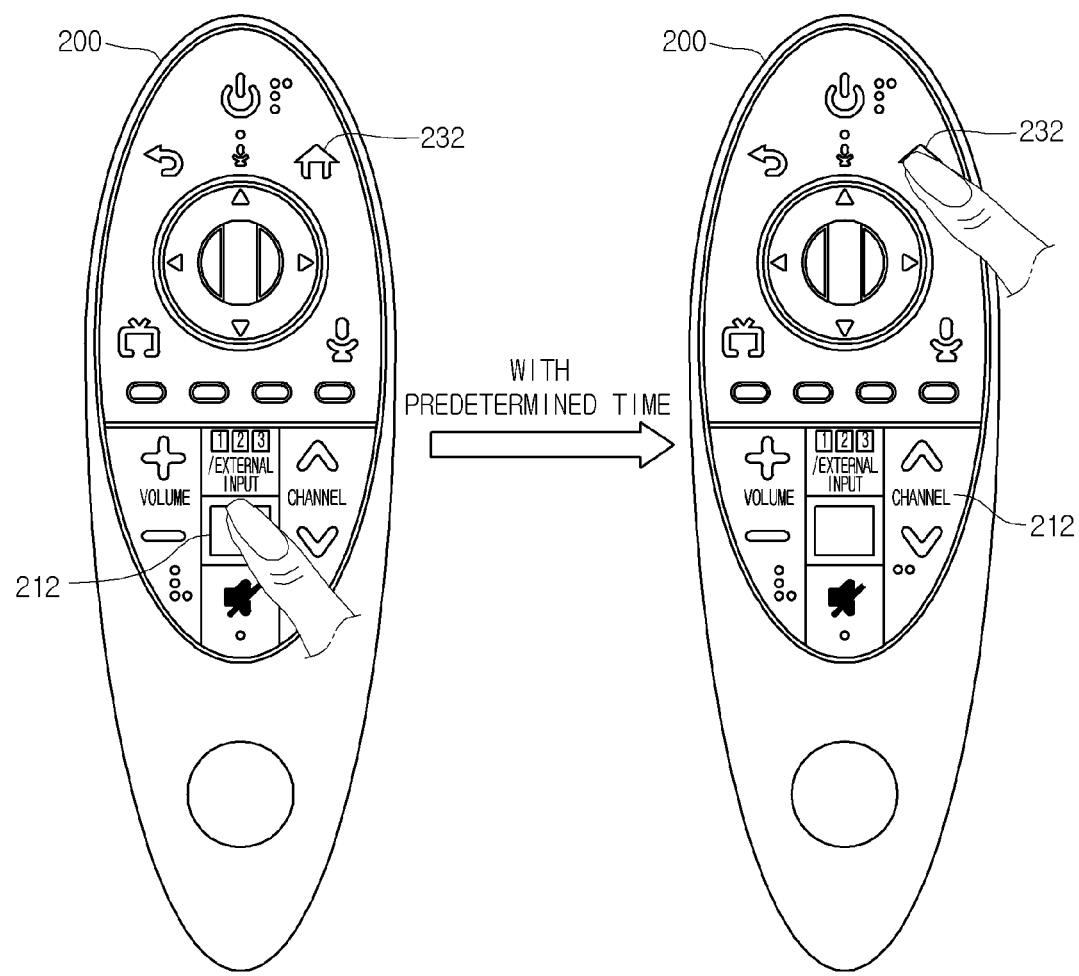
FIG. 21 is a view of a user's function key input according to another embodiment of the present invention.

FIG. 21 is a view of a user's function key input according to another embodiment of the present invention.

Figure 22:
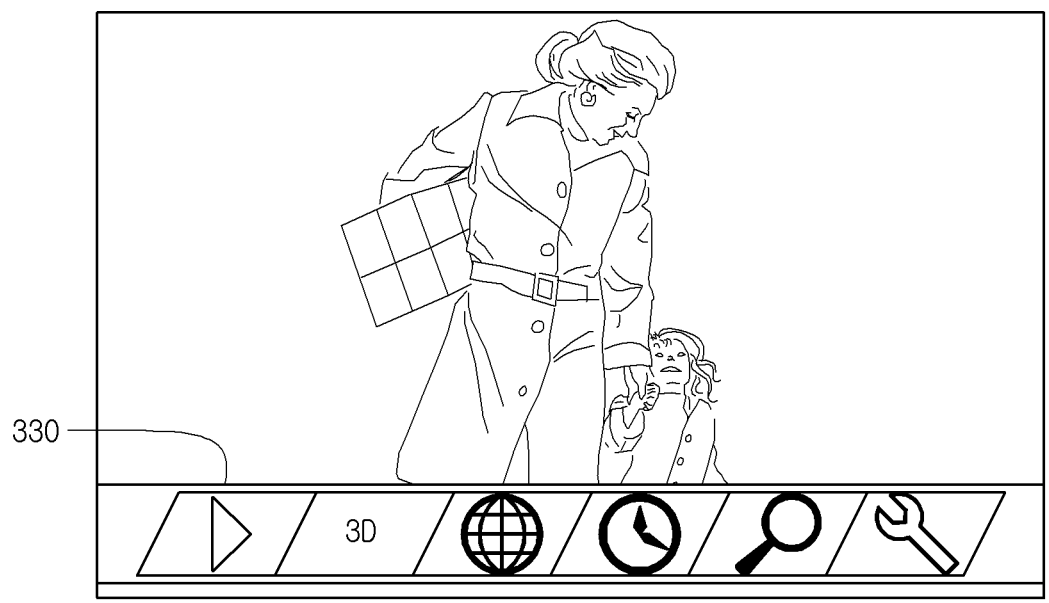
FIG. 22 is a view illustrating a user's favorite menu list according to an embodiment of the present invention.

FIG. 22 is a view illustrating a user's favorite menu list according to an embodiment of the present invention.

According to an embodiment of the present invention, referring to FIG. 21, when receiving a user's fingerprint input from the remote control device 200 and receiving a user input for the home menu button 232 from the remote control device 200 within a predetermined time, the control unit 170 of the video display device 100 may obtain information on an operation corresponding to the inputted user fingerprint and home menu button 232. Herein, an operation corresponding to the inputted user fingerprint and home menu button 232 may be an operation for displaying a user's favorite menu corresponding to the inputted fingerprint. Additionally, the control unit 170 may obtain information on a favorite menu list display or an execution of one of a favorite menu on the basis of at least one of the intensity of a user input and an input time for the home menu button 232. Then, if a user input time for the home menu button 232 is short, the control unit 170 may display a user's favorite menu list. The control unit 170 may obtain a favorite menu list, that is, a menu function that a user who inputs a fingerprint uses frequently on the basis of a collected pattern for a user's menu usage. Accordingly, as shown in FIG. 22, the control unit 170 may display a favorite menu list 330 of a user who inputs a fingerprint. Additionally, the control unit 170 may obtain a favorite menu list for a user who inputs a fingerprint on the basis of a setting for a personalized service that the user inputs. Moreover, if a user input time for the home menu button 232 is long, the control unit 170 may execute one menu among favorite menus of a user who inputs a fingerprint.

Another embodiment will be described with reference to FIGS. 23 and 24.

Figure 23:
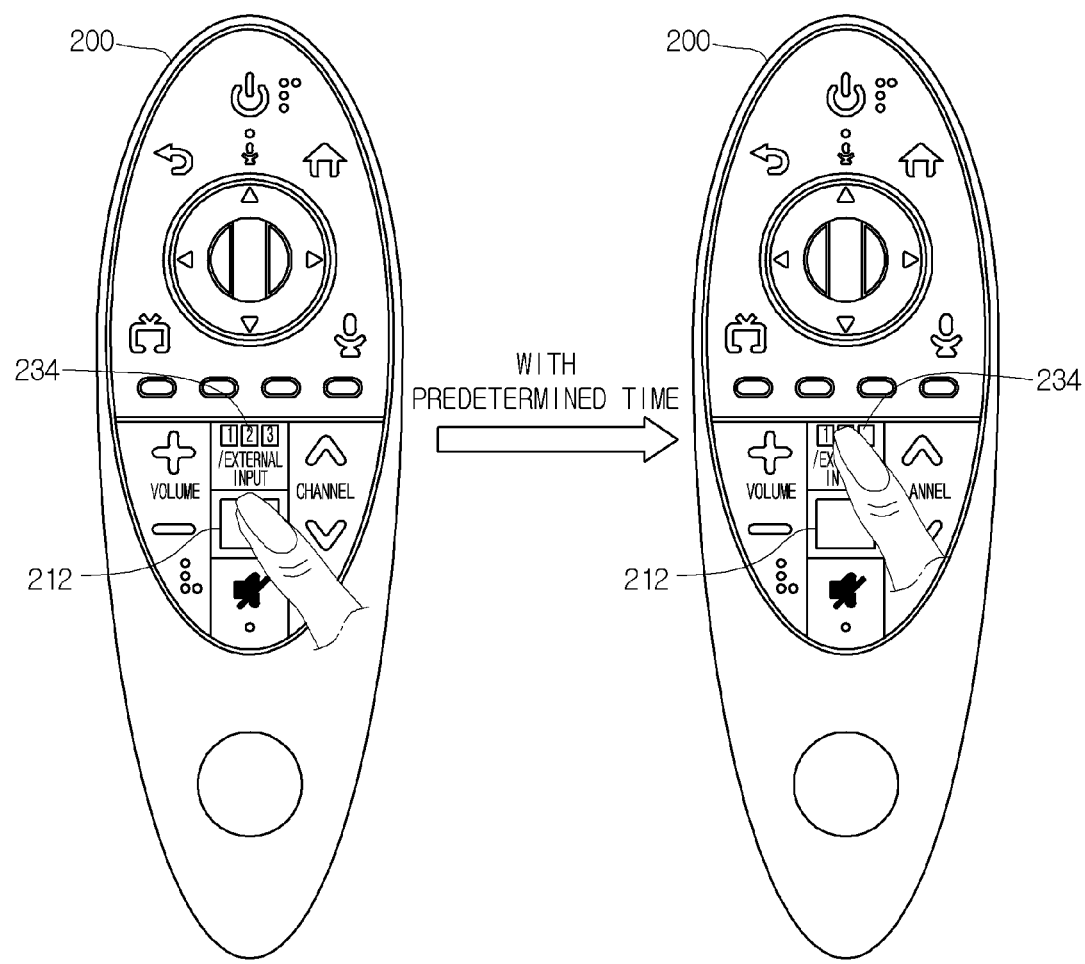
FIG. 23 is a view of a user's function key input according to another embodiment of the present invention.

FIG. 23 is a view of a user's function key input according to another embodiment of the present invention.

Figure 24:
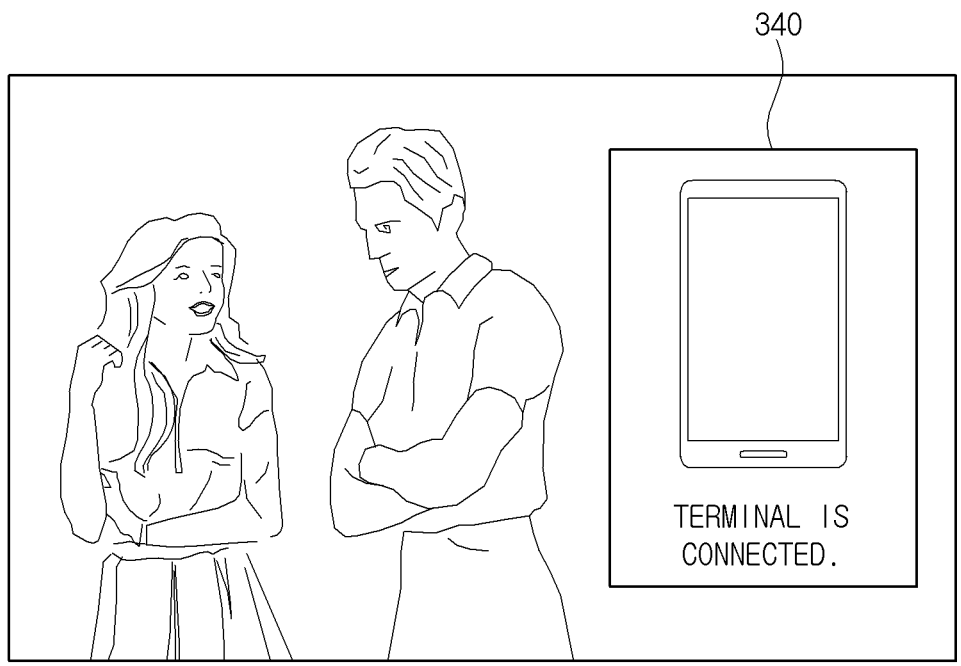
FIG. 24 is a view of an external device connection according to an embodiment of the present invention.

FIG. 24 is a view of an external device connection according to an embodiment of the present invention.

According to an embodiment of the present invention, referring to FIG. 23, when receiving a user's fingerprint input from the remote control device 200 and receiving a user input for the external input button 234 from the remote control device 200 within a predetermined time, the control unit 170 of the video display device 100 may obtain information on an operation corresponding to the inputted user fingerprint and external input button 234. Herein, an operation corresponding to the inputted user fingerprint and external input button 234 may be an operation for connecting to an external device (not shown) that a user corresponding to the inputted fingerprint frequently uses. Additionally, the control unit 170 may obtain information on one operation among a list display of an external device (not shown) that a user frequently uses or a connection of an external device that a user frequently uses on the basis of at least one of the intensity of a user input and an input time for the external input button 234. Then, if a user input time for the external input button 234 is long, the control unit 170 may connect to an external device (not shown) that a user frequently uses. The control unit 170 may obtain a list for external devices that a user, who inputs a fingerprint, frequently uses on the basis of a collected pattern for a user's function usage. Accordingly, as shown in FIG. 24, the control unit 170 may connect to a terminal, that is, an external device that a user, who inputs a fingerprint, uses frequently. Additionally, the control unit 170 may obtain a list for external devices that a user, who inputs a fingerprint, frequently uses on the basis of a setting for a personalized service that the user inputs. Moreover, if a user input time for the external input button 234 is short, the control unit 170 may display a list for external devices that a user, who inputs a fingerprint, frequently uses.

Another embodiment will be described with reference to FIGS. 25 and 26.

Figure 25:
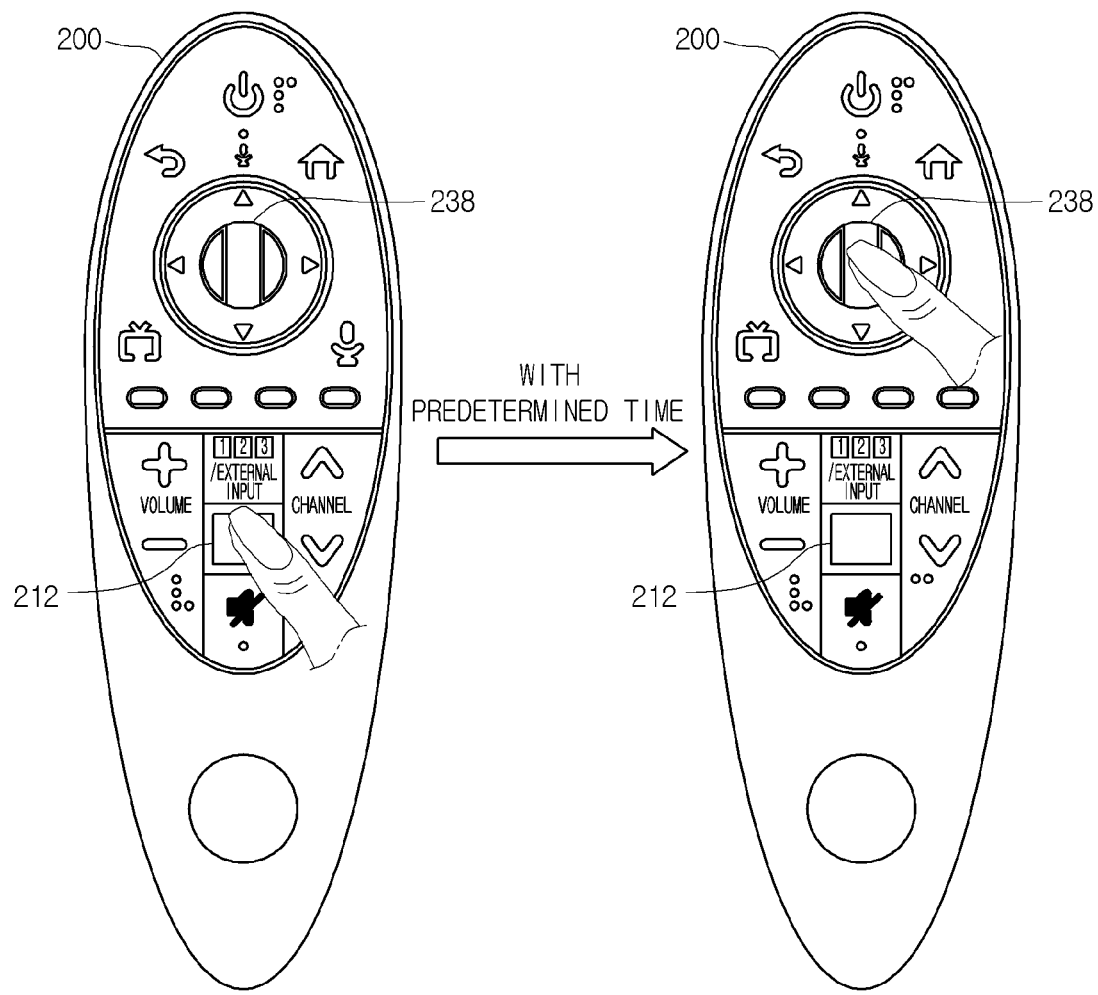
FIG. 25 is a view of a user's function key input according to another embodiment of the present invention.

FIG. 25 is a view of a user's function key input according to another embodiment of the present invention.

Figure 26:
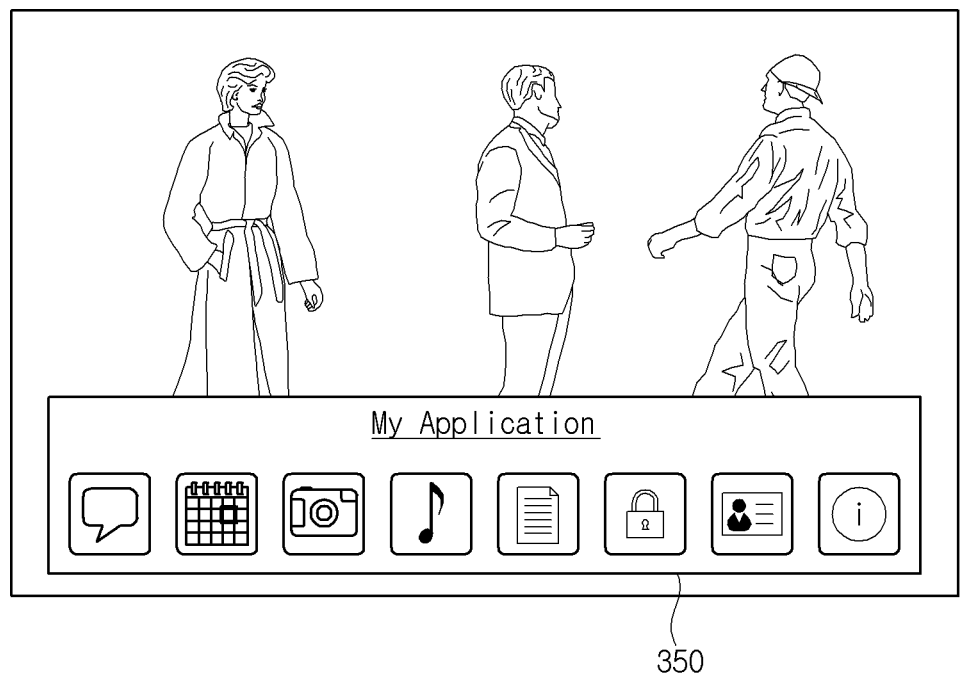
FIG. 26 is a view illustrating a user's favorite application list according to an embodiment of the present invention.

FIG. 26 is a view illustrating a user's favorite application list according to an embodiment of the present invention.

According to an embodiment of the present invention, referring to FIG. 25, when receiving a user's fingerprint input from the remote control device 200 and receiving a user input for the wheel button 238 from the remote control device 200 within a predetermined time, the control unit 170 of the video display device 100 may obtain information on an operation corresponding to the inputted user fingerprint and wheel button 238. Herein, an operation corresponding to the inputted user fingerprint and wheel button 238 may be an operation for displaying a list for applications that a user corresponding to the inputted fingerprint frequently uses. Additionally, the control unit 170 may obtain information on one application execution among an audio setting or a display of a list for applications that a user frequently uses or an execution of one application among applications that a user frequently uses on the basis of at least one of the intensity of a user input for the wheel button 238. Then, if a user input time for the wheel button 238 is short, the control unit 170 may display a list for applications that a user frequently uses. The control unit 170 may obtain a list for applications that a user, who inputs a fingerprint, frequently uses on the basis of a collected pattern for a user's application usage. Accordingly, as shown in FIG. 26, the control unit 170 may display a list 350 for applications that a user, who inputs a fingerprint, frequently uses. Additionally, the control unit 170 may obtain a list for applications that a user, who inputs a fingerprint, frequently uses on the basis of a setting for a personalized service that the user inputs. Moreover, if a user input time for the wheel button 238 is long, the control unit 170 may execute an application that a user frequently uses.

The description for information acquisition on an operation corresponding to an inputted fingerprint and function key is just an example, and thus may be set diversely according to a user's or designer's selection. Therefore, in addition to the above-mentioned embodiments, various operations may be set for various function keys according to a user's or designer's selection.

In such a way, the video display device 100 may receive a personalized service setting for a user who inputs at least one of bio information and pattern input and may provide a personalized operation to a user who inputs at least one of bio information and pattern information.

According to various embodiments of the present invention, the prevent invention may provide a function and content fit for a recognized user.

Additionally, the present invention may easily execute a function and menu that a user wants through a combination of user's bio information, pattern input, and function key input.

Additionally, the video display device may easily execute a function and menu that a user wants through a combination of a user's fingerprint input and function key input.

According to an embodiment of the present invention, the above method may be implemented on a program recorded medium as processor readable code. Examples of the processor readable medium may include ROM, RAM, CD-ROM, magnetic tape, floppy disk, and optical data storage devices and also may be implemented in a form of a carrier wave (for example, transmission through internet).

In relation to the above-described video display device, the configurations and methods of the above-described embodiments are applied without limitations and in order to provide various modifications, some or all of embodiments may be selectively combined and configured.

What is claimed is:

1. An operating method of a video display device, the method comprising:
   obtaining user's bio information;
   displaying a predetermined time, wherein the predetermined time indicates a remaining time which the video display device performs an operation personalized to a user in response to a receipt of a user input for a function key input;
   upon the receipt of a user input for a function key input of the video display device within a predetermined time, performing an operation personalized to the user on the basis of the obtained user's bio information and the function key input; and
   upon the receipt of the user input for the function key input after the predetermined time elapses, performing an operation corresponding to the function key,
   wherein the bio information comprises at least one of a user's fingerprint, iris, vein, face and voice.

2. The method according to claim 1, wherein obtaining the user's bio information comprises:
   obtaining pattern input, and
   wherein the pattern input comprises at least one of a user's specific gesture operation, specific key input, specific form input, specific path input, and specific voice speech.

3. The method according to claim 2, wherein the performing of the operation personalized to the user comprises:
   obtaining information on a user's personalized service setting corresponding to at least one of the obtained user's bio information and pattern input from pre-stored user information; and
   obtaining information on an operation corresponding to the function key input on the basis of the information on the obtained user's personalized service setting.

4. The method according to claim 3, further comprising displaying the information on the obtained user's personalized service setting.

5. The method according to claim 4, wherein the information on the obtained user's personalized service setting comprises at least one of the information on the personalized operation corresponding to the function key input, and the obtained bio information and pattern information.

6. The method according to claim 2, further comprising collecting a pattern for a usage of the video display device,
   wherein the pattern for the usage of the video display device comprises at least one of a user's pattern for a function, a broadcast viewing pattern, a contents viewing pattern, a pattern for a menu usage, a setting value setting, a pattern for an application usage, which relate to the user's video display device.

7. The method according to claim 6, wherein the performing of the operation personalized to the user comprises performing the operation personalized to the user on the basis of the collected pattern for the usage of the video display device.

8. The method according to claim 1, further comprising receiving a user input for a personalized service setting to set an operation personalized to the user,
   wherein the personalized service setting comprises a setting for at least one of functions that the user frequently uses, applications that the user frequently uses, external inputs that the user frequently uses, menus that the user frequently uses, channels that the user frequently views, contents that the user frequently views, and setting values that the user sets and a setting for least one of a length of the predetermined time and a personalized operation corresponding to the function key input.

9. The method according to claim 1, wherein the operation personalized to the user comprises at least one of an operation for displaying a personalized menu to the user and an operation for executing a function personalized to the user.

10. The method according to claim 1, further comprising, upon the receipt of a user input for canceling a personalized service entry performing an operation personalized to the user within the predetermined time, switching into a normal mode to perform an operation corresponding to the function key.

11. A video display device comprising:
   a user input interface unit obtaining user's bio information;
   a display unit displaying a predetermined time, wherein the predetermined time indicates a remaining time which the video display device performs an operation personalized to a user in response to a receipt of a user input for a function key input; and
a control unit,
wherein the control unit,
upon the receipt of a user input for a function key input of the video display device within a predetermined time, performs an operation personalized to the user on the basis of the obtained user's bio information and the function key input, and
upon the receipt of the user input for the function key input after the predetermined time elapses, performs an operation corresponding to the function key, and
wherein the bio information comprises at least one of a user's fingerprint, iris, vein, face and voice.

12. The device according to claim 11, wherein the user input interface unit further obtains pattern input, and
wherein the pattern input comprises at least one of a user's specific gesture operation, specific key input, specific form input, specific path input, and specific voice speech.

13. The device according to claim 12, further comprising a storage unit,
wherein the control unit obtains information on a user's personalized service setting corresponding to at least one of the obtained user's bio information and pattern input from pre-stored user information in the storage unit and obtains information on an operation corresponding to the function key input on the basis of the information on the obtained user's personalized service setting.

14. The device according claim 13,
wherein the control unit displays the information on the obtained user's personalized service setting through the display unit.

15. The device according to claim 14, wherein the information on the obtained user's personalized service setting comprises at least one of the information on the personalized operation corresponding to the function key input, and the obtained bio information and pattern information.

16. The device according to claim 12, wherein the control unit collects a pattern for a usage of the video display device, and
wherein the pattern for the usage of the video display device comprises at least one of a user's pattern for a function, a broadcast viewing pattern, a contents viewing pattern, a pattern for a menu usage, a setting value setting, a pattern for an application usage, which relate to the user's video display device.

17. The device according to claim 16, wherein the control unit performs the operation personalized to the user on the basis of the collected pattern for the usage of the video display device.

18. The device according to claim 11, wherein the control unit obtains a user input for a personalized service setting to set an operation personalized to the user through the user input interface unit, and
wherein the personalized service setting comprises a setting for at least one of functions that the user frequently uses, applications that the user frequently uses, external inputs that the user frequently uses, menus that the user frequently uses, channels that the user frequently views, contents that the user frequently views, and setting values that the user sets and a setting for least one of a length of the predetermined time and a personalized operation corresponding to the function key input.

19. The device according to claim 11, wherein the operation personalized to the user comprises at least one of an operation for displaying a personalized menu to the user and an operation for executing a function personalized to the user.

20. The device according to claim 11, wherein the control unit, upon the receipt of a user input for canceling a personalized service entry performing an operation personalized to the user through the user input interface unit within the predetermined time, switches into a normal mode to perform an operation corresponding to the function key.

* * * * *